(12) United States Patent
Ozaki et al.

(10) Patent No.: US 12,286,542 B2
(45) Date of Patent: Apr. 29, 2025

(54) INK DISCHARGING DEVICE, METHOD OF DISCHARGING INK, METHOD OF MANUFACTURING INK-DISCHARGED MATTER, WHITE INK, AND SET

(71) Applicants: Daisuke Ozaki, Kanagawa (JP); Toshiyuki Kobashi, Tokyo (JP); Hiroshi Gotou, Kanagawa (JP); Ayaka Tanaka, Kanagawa (JP); Juichi Furukawa, Kanagawa (JP)

(72) Inventors: Daisuke Ozaki, Kanagawa (JP); Toshiyuki Kobashi, Tokyo (JP); Hiroshi Gotou, Kanagawa (JP); Ayaka Tanaka, Kanagawa (JP); Juichi Furukawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 291 days.

(21) Appl. No.: 18/184,887

(22) Filed: Mar. 16, 2023

(65) Prior Publication Data
US 2023/0303869 A1    Sep. 28, 2023

(30) Foreign Application Priority Data
Mar. 22, 2022 (JP) ................. 2022-046128

(51) Int. Cl.
*B41J 2/14* (2006.01)
*C09D 11/322* (2014.01)
(52) U.S. Cl.
CPC ........... *C09D 11/322* (2013.01); *B41J 2/1433* (2013.01); *B41J 2202/03* (2013.01)

(58) Field of Classification Search
CPC ............. B41J 2/1433; B41J 2/161; B41J 2002/14362; B41J 2002/14491;
(Continued)

(56) References Cited

U.S. PATENT DOCUMENTS 10,301,487 B2 *  5/2019  Takahashi ............ C09D 11/102
2003/0097753 A1   5/2003  Sasaki et al.
(Continued)

FOREIGN PATENT DOCUMENTS

JP    2003-019803    1/2003
JP    2006-281767    10/2006
(Continued)

OTHER PUBLICATIONS

Robert F. Fedors, "A method for estimating both the solubility parameters and molar volumes of liquids", Polymer Engineering and Science Feb. 1974, vol. 14, No. 2, p. 147-151.

(Continued)

*Primary Examiner* — Anh T Vo
(74) *Attorney, Agent, or Firm* — Grüneberg and Myers PLLC

(57) ABSTRACT

An ink discharging device contains an ink containing an organic solvent with an SP value of from 9.0 to 12.0, a white pigment, a polyurethane resin with a glass transition temperature Tg of 0 degrees C. or lower, and water, and an ink discharging unit including a nozzle plate including a liquid repellent layer containing a silicone resin, the ink discharging unit for discharging the ink, wherein the proportion of the organic solvent to the entire of the ink is from 0.5 to 2.5 percent by mass and the proportion of the white pigment to the entire of the ink is from 6 to 15 percent by mass.

12 Claims, 5 Drawing Sheets

(58) Field of Classification Search
CPC . B41J 2202/03; B41J 2202/11; C09D 11/102; C09D 11/322; C09D 11/38; C09D 11/40; C09D 11/54

See application file for complete search history.

(56) References Cited

U.S. PATENT DOCUMENTS

| | | |
|---|---|---|
| 2007/0242107 A1 | 10/2007 | Mori |
| 2014/0071203 A1* | 3/2014 | Kimura ................. B41J 2/1606 347/45 |
| 2020/0039274 A1 | 2/2020 | Ozaki |
| 2020/0239714 A1 | 7/2020 | Gotou et al. |
| 2020/0391533 A1 | 12/2020 | Gotou |
| 2021/0138817 A1 | 5/2021 | Arita et al. |
| 2022/0282107 A1 | 9/2022 | Ozaki et al. |
| 2022/0289993 A1 | 9/2022 | Ozaki et al. |
| 2022/0298373 A1 | 9/2022 | Gotou et al. |

FOREIGN PATENT DOCUMENTS

| | | |
|---|---|---|
| JP | 2007-169371 | 7/2007 |
| JP | 2007-307888 | 11/2007 |
| JP | 2015-199299 | 11/2015 |
| JP | 2018-122588 | 8/2018 |
| JP | 2020-117683 | 8/2020 |
| JP | 2020-199717 | 12/2020 |

OTHER PUBLICATIONS

Robert F. Fedors, "A method for estimating both the solubility parameters and molar volumes of liquids", Polymer Engineering and Science Feb. 1974, vol. 14, No. 2, p. 152-154.

* cited by examiner

INK DISCHARGING DEVICE, METHOD OF DISCHARGING INK, METHOD OF MANUFACTURING INK-DISCHARGED MATTER, WHITE INK, AND SET

CROSS-REFERENCE TO RELATED APPLICATIONS

This patent application is based on and claims priority pursuant to 35 U.S.C. § 119 to Japanese Patent Application No. 2022-046128, filed on Mar. 22, 2022, in the Japan Patent Office, the entire disclosure of which is hereby incorporated by reference herein.

BACKGROUND

Technical Field

The present disclosure is related to an ink discharging device, a method of discharging ink, a method of manufacturing ink-discharged matter, a white ink, and a set

Description of the Related Art

Since inkjet printers have the advantage of being capable of readily printing color images, they are now widely used at home to output digital information.

In addition to home use, inkjet printing is required to support printing on poorly permeable media such as coated paper, impermeable media such as plastic film, and fabrics such as woven fabrics and knitted fabrics with image quality on a par with that of existing analog printing.

The market of direct printing on fabric such as T-shirts, so-called direct to garments (DTG), is expanding year by year in the dyeing business. With the rise of the personal recommendation business in the apparel business and the trend of active collaboration with fine art appearing in the interior textile field, there is demand for inkjet printing capable of printing images with excellent coloring and robustness on fabric.

Unlike screen printing and other standard printing, inkjet printing forms an image directly on fabric using ink containing a pigment, obviating the need for manufacturing, storing, and rinsing a color plate. This printing is thus suitable for high-mix, low-volume manufacturing. Moreover, it quickens delivery by dispensing with transferring and demonstrates excellent light resistance. Ink for inkjet printing is thus required and has been developed.

It includes printing an image on fabrics already colored by dyeing or printing.

One way of printing an image on such colored fabrics, including dark colors like black or navy blue, is to cover the fabrics with white ink before printing an image with color ink. The white ink's layer forms a backdrop of the color ink, imparting coloring properties enough to demonstrate the color on the fabric. In this image forming, white ink is required to have a high level of whiteness to conceal the dark color of the fabric.

Such white ink contains a significant content of volatile components to demonstrate the high level of whiteness. Therefore, due to these volatile components, the white ink may form non-uniform pools around the nozzle for discharging the white ink; such non-uniform pools may misdirect the white ink droplets, vary the ink droplet's size, and destabilize the discharging speed of the ink; and the pools may dry and become sticky if the volatile components evaporate, which leads to defective discharging.

SUMMARY

According to embodiments of the present disclosure, an ink discharging device is provided which contains an ink that contains an organic solvent with an SP value of from 9.0 to 12.0; a white pigment, a polyurethane resin with a glass transition temperature Tg of 0 degrees C. or lower; and water, and an ink discharging unit comprising a nozzle plate comprising a liquid repellent layer containing a silicone resin, the ink discharging unit configured to discharge the ink, wherein the proportion of the organic solvent to the entire of the ink is from 0.5 to 2.5 percent by mass, wherein the proportion of the white pigment to the entire of the ink is from 6 to 15 percent by mass.

As another aspect of embodiments of the present disclosure, a method of manufacturing ink-discharged matter is provided which includes applying a processing fluid comprising a multivalent metal salt and water and discharging an ink that contains an organic solvent with an SP value of from 9.0 to 12.0, a white pigment, a polyurethane resin with a glass transition temperature Tg of 0 degrees C. or lower, and water, with an ink discharging unit including a nozzle plate that includes a liquid repellent layer containing a silicone resin, wherein the proportion of the organic solvent to the entire of the ink is from 0.5 to 2.5 percent by mass, wherein the proportion of the white pigment to the entire of the ink is from 6 to 15 percent by mass.

As another aspect of embodiments of the present disclosure, a white ink is provided which contains an organic solvent with an SP value of from 9.0 to 12.0, a white pigment, a polyurethane resin with a glass transition temperature Tg of 0 degrees C. or lower, and water, wherein the proportion of the organic solvent to the entire of the white ink is from 0.5 to 2.5 percent by mass, wherein the proportion of the white pigment to the entire of the white ink is from 6 to 15 percent by mass.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
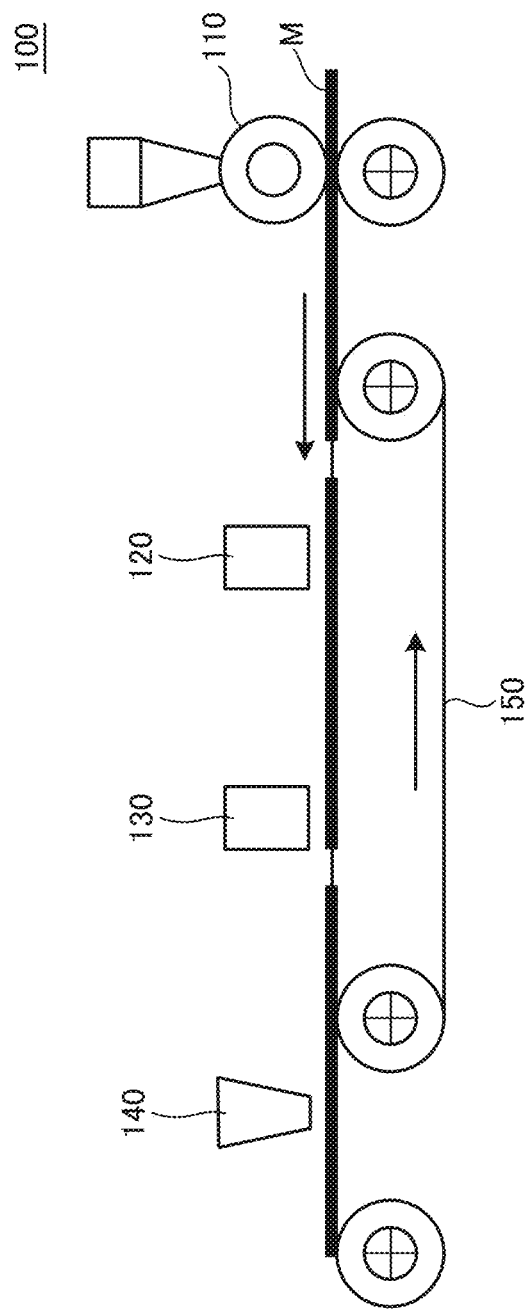
FIG. 1 is a schematic diagram illustrating an image forming apparatus including the ink discharging device according to an embodiment of the present invention.

The accompanying drawings are intended to depict example embodiments of the present invention and should not be interpreted to limit the scope thereof.

The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

The terms of image forming, recording, and printing in the present disclosure represent the same meaning.

Also, recording media, media, and print substrates in the present disclosure have the same meaning unless otherwise specified.

According to the present disclosure, an ink discharging device is provided which has a nozzle with high resistance to wiping, forms an image with a high level of whiteness and excellent robustness, and stably discharges ink.

Next, one embodiment of the present disclosure is described.

Liquid Discharging Device and Method of Discharging Ink

The ink discharging device of the present disclosure contains an organic solvent with an SP value of from 9.0 to 12.0, a white pigment, a polyurethane resin with a glass transition temperature Tg of 0 degrees C. or lower, and water, and an ink discharging unit for discharging the ink including a nozzle plate including a liquid repellent layer containing a silicone resin.

The ink discharging device may include an ink container, a processing fluid container, a device for applying a processing fluid, and other optional members.

The method of discharging an ink of the present disclosure includes discharging the ink mentioned above with the ink discharging device of the present disclosure and other optional processes.

Specifically, the method of discharging an ink of the present disclosure includes discharging an ink containing an organic solvent with an SP value of from 9.0 to 12.0, a white pigment, a polyurethane resin with a glass transition temperature Tg of 0 degrees C. or lower, and water from an ink discharging unit including a nozzle plate including a liquid repellent layer containing a silicone resin. The method may furthermore include applying a processing fluid and other optional processes.

In ink in the ink discharging device of the present disclosure and the method of discharging an ink, the proportion of the organic solvent to the entire of the ink is from 0.5 to 2.5 percent by mass and the proportion of the white pigment to the entire of the ink is from 6 to 15 percent by mass.

Below are typical problems. The ink repellent layer disposed at the surface of a nozzle plate is slowly abraded by repeated wiping in cleaning. The function of the ink repellent layer is finally lost. Therefore, ink pools are readily formed in discharging liquid droplets from the nozzle in the sequence above, causing defective discharging and harming the image quality. This problem is related to the properties of the ink in a liquid discharging head and is especially severe for an ink containing a white pigment with a large particle diameter. This is because the white pigment in the ink between the ink repellent layer and the wiper acts as an abrasive. Resistance to wiping deteriorates significantly, especially in the combination of a nozzle plate with an ink repellent film of a silicone resin formed thereon and an ink containing a white pigment.

The inventors of the present invention investigate this problem and have found the following regarding typical technologies.

According to these technologies, at least one of the wiping, cleaning properties, and resistance of a liquid repellent film to wiping is excellent. The inventors of the present invention have found that these technologies can be effective for color inks but need more regarding resistance to wiping.

The inventors of the present invention also investigated reducing the content of the white pigment in ink as a way to solve the issue relating to resistance to wiping. However, the degree of whiteness becomes insufficient because of this reduction, which degrades the image quality.

The inventors of the present disclosure have found that images with a high degree of whiteness can be obtained and high resistance to wiping can be achieved by the combination of an ink discharging unit including a nozzle plate including a liquid repellent layer containing a silicone resin and an ink containing an organic solvent with an SP value of from 9.0 to 12.0, a white pigment, a polyurethane resin with a glass transition temperature Tg of 0 degrees C. or lower, and water, wherein the proportion of the organic solvent to the entire of the ink is from 0.5 to 2.5 percent by mass and the proportion of the white pigment to the entire of the ink is from 6 to 15 percent by mass.

This ink is found to have excellent ink discharging stability and assist obtaining robust images.

The method of discharging an ink of the present disclosure can be suitably executed by the ink discharging device of the present disclosure, the ink discharging process can be suitably executed by the ink discharging unit, and the other optional processes can be executed by the other optional members.

Ink Container

The ink container contains ink.

In other words, the ink is present in the ink container.

The ink container is not particularly limited. It includes a container of a liquid composition for use in a discharging or applying method.

An available ink cartridges can be used as the container for use in discharging.

Specific examples of containers for use in applying include, but are not limited to, known containers of a liquid composition for use in blade coating, gravure coating, gravure offset coating, wire-bar coating, bar coating, roll coating, knife coating, air knife coating, comma coating, U comma coating, AKKU coating, smoothing coating, MICROGRAVURE™ coating, reverse roll coating, four or five roll coating, dip coating, curtain coating, slide coating, and die coating.

Ink

The ink mentioned above contains an organic solvent with an SP value of from 9.0 to 12.0, a white pigment, a polyurethane resin with a glass transition temperature Tg of 0 degrees C. or lower, and water, wherein the proportion of the organic solvent to the entire of the ink is from 0.5 to 2.5 percent by mass, wherein the proportion of the white pigment to the entire of the ink is from 6 to 15 percent by mass. It may furthermore contain other optional components.

Organic Solvent

The organic solvent contains an organic solvent with an SP value of from 9.0 to 12.0 and other optional organic solvents.

SP value refers to a solution parameter and is generally used as an index for affinity and solubility of materials such as a solvent, a resin, and a pigment dissolved or dispersed in water or a solvent for use.

The SP value can be obtained in various ways, such as by measuring in experiments, calculating from measuring physical properties such as immersion heat, or calculating from molecular structures. In the present disclosure, an SP value is obtained by the calculation method based on the molecule structure proposed by Fedors.

This method has the advantages that the SP value can be calculated for an available molecule structure and that the difference between the SP value calculated and the SP value measured in an experiment is slight.

In the Fedors method, an SP value can be obtained according to Formula A below based on the evaporation energy $\Delta ei$ and the molar volume $\Delta vi$ of each atom or a group of atoms at 25 degrees C.

$$\text{SP Value} = (\Sigma \Delta ei / \Delta vi)^{1/2} \quad \text{Formula A}$$

In the present disclosure, according to the Method of Fedors, the SP value calculated from a molecular structure is used and represented in $(\text{cal/cm}^3)^{1/2}$.

Also, in the present disclosure, the SP value at 25 degrees C. is used and not subjected to temperature conversion and others.

SP values can be calculated according to Fedors method disclosed in R. F. Fedors: Polym. Eng. Sci., 14 [2], 147-154.

The organic solvent mentioned above has an SP value of from 9.0 to 12.0 and preferably from 9.0 to 10.6.

In the present disclosure, the proportion of the organic solvent with an SP value of from 9.0 to 12.0 to the entire of the ink is from 0.5 to 2.5 percent by mass, preferably from 0.5 to 2.0 percent by mass, and more preferably from 0.5 to 1.5 percent by mass. An organic solvent with an SP value of 9.0 or greater increases the degree of whiteness of an image obtained when the proportion of the organic solvent to the entire of the ink is from 0.5 to 2.5 percent by mass. An organic solvent with an SP value of 12.0 or less enhances resistance to wiping when the proportion of the organic solvent to the entire of the ink is from 0.5 to 2.5 percent by mass.

Specific examples of the organic solvents with an SP value of from 9.0 to 12.0 include, but are not limited to, 3-ethyl-3-hydroxylmethyloxetane (SP value=11.3 $(\text{cal/cm}^3)^{1/2}$), β-methoxy-N,N-dimethylpropionamide (SP value=9.2 $(\text{cal/cm}^3)^{1/2}$), β-butoxy-N,N-dimethylpropionamide (SP value=9.0 $(\text{cal/cm}^3)^{1/2}$), diethylene glycol monoethyl ether (SP value=10.1 $(\text{cal/cm}^3)^{1/2}$), diethylene glycol monoisopropyl ether (SP value=9.8 $(\text{cal/cm}^3)^{1/2}$), diethylene glycol monoisobutyl ether (SP value=9.7 $(\text{cal/cm}^3)^{1/2}$), tripropylene glycol methyl ether (SP value=9.8 $(\text{cal/cm}^3)^{1/2}$), 3-methyl-1, 5-pentanediol (SP value=11.8 $(\text{cal/cm}^3)^{1/2}$), polypropylene glycol 250 (SP value=10.5 $(\text{cal/cm}^3)^{1/2}$, number-average molecular weight of 250), polypropylene glycol 400 (SP value=9.8 $(\text{cal/cm}^3)^{1/2}$, number average molecular weight of 400), polypropylene glycolglyceryl ether (SP value=10.3 $(\text{cal/cm}^3)^{1/2}$), polypropylene glycol monomethyl ether (SP value=9.1 $(\text{cal/cm}^3)^{1/2}$), and 2-ethyl-1,3-hexanediol (SP value=10.6 $(\text{cal/cm}^3)^{1/2}$). These can be used alone or in combination.

The organic solvent may contain an organic solvent other than the organic solvent with an SP value of 9.0 to 12.0 as long as the organic solvent with an SP value of 9.0 to 12.0 is contained in an amount of from 0.5 to 2.5 percent by mass.

The other organic solvent has no specific limit and can be suitably selected to suit to a particular application. For example, water-soluble organic solvents are usable.

Examples of the water-soluble organic solvent include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutyl ether, diethylene glycol monomethylether, diethylene glycol monoethylether, diethylene glycol monobutyl ether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, □-caprolactam, and □-butyrolactone; amides such as formamide, N-methylformamide, N,N-dimethylformamide, 3-methoxy-N,N-dimethyl propionamide, and 3-buthoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

The other organic solvent is not particularly limited and can be suitably selected to suit to a particular application.

White Pigment

The white pigment has no specific limit and is suitably selected to suit to a particular application. For example, an inorganic pigment and organic pigment are usable.

These can be used alone or in combination. Mixed crystal can also be used as the coloring material.

Preferable specific examples of the inorganic pigment include, but are not limited to, titanium oxide, iron oxide, calcium oxide, barium sulfate, and aluminum hydroxide.

Hollow resin particles and hollow inorganic particles can also be used as the white pigment.

Specific examples of the pigment include, but are not limited to, metals such as titanium oxide and organic pigments.

White pigment-dispersed ink is obtained by, for example, preparing a self-dispersible pigment through an introduction of a hydrophilic functional group into the white pigment mentioned above, coating the surface of the white pigment with a resin followed by dispersion, or using a dispersant for dispersing the white pigment.

One way of introducing a hydrophilic functional group into the white pigment is to add a functional group, such as a sulfone group and a carboxyl group, to the white pigment to render the white pigment dispersed in water.

One way of dispersing the white pigment by coating the surface of the white pigment with a resin is to encapsulate the white pigment in microencapsules to render the white pigment dispersed in water. This microencapsulated pigment is also referred to as a resin-coated pigment. The resin-coated white pigment particles in ink are not necessarily entirely coated with a resin. The pigment particles not partially or wholly covered with a resin may be dispersed in ink unless such particles have an adverse impact.

As the dispersant for use in the dispersion method described above, a known dispersant of a small or large molecular weight, typically a surfactant, is suitable.

It is possible to select an anionic surfactant, cationic surfactant, nonionic surfactant, amphoteric surfactant, or others in accordance with the type of white pigment.

Also, a nonionic surfactant, RT-100, manufactured by TAKEMOTO OIL & FAT CO., LTD. and a formalin condensate of naphthalene sodium sulfonate are suitable as the dispersant.

Those can be used alone or in combination.

Pigment Dispersion

The white ink mentioned above can be obtained by mixing a pigment with materials such as water and an organic solvent. It is also possible to mix the white pigment with water, a dispersant, and other substances to prepare a pigment dispersion and thereafter mix the pigment dispersion with materials, such as water and an organic solvent to manufacture ink.

The particle size of this pigment dispersion is adjusted by mixing or dispersing with water, a pigment, a pigment dispersant, and other optional components. It is good to use a dispersing device for dispersion.

The particle diameter of the white pigment in the pigment dispersion has no particular limit. For example, the maximum frequency is preferably from 20 to 500 nm and more preferably from 20 to 150 nm in the maximum number conversion to improve dispersion stability of the white pigment and ameliorate discharging stability and the image quality such as image density. The particle diameter of a pigment can be analyzed using a particle size analyzer (Nanotrac Wave-UT151, manufactured by MicrotracBEL Corp).

The proportion of the resin in the pigment dispersion mentioned above is preferably from 6 to 15 percent by mass and more from preferably 8 to 11 percent by mass in solid form to the entire of ink. An ink containing a pigment at 6 percent by mass or greater demonstrates a good level of whiteness. An ink containing a pigment at 15 percent by mass or less demonstrates good discharging stability and resistance to wiping, It is preferable that the pigment dispersion be filtered with an instrument such as filter and a centrifuge to remove coarse particles followed by deaerating.

The particle diameter of the solid content in ink has no particular limit and can be suitably selected to suit to a particular application. For example, the maximum frequency in the maximum number conversion is preferably from 20 to 1,000 nm and more preferably from 20 to 150 nm to ameliorate discharging stability and image quality such as optical density. The solid content includes particles such as resin particles and pigment particles. The particle diameter can be measured by using a particle size analyzer (Nanotrac Wave-UT151, manufactured by MicrotracBEL Corp).

Properties of the ink can be suitably selected to suit to a particular application. The ink preferably has properties such as viscosity, surface tension, and pH in the following ranges.

The ink preferably has a viscosity of from 5 to 30 mPa·s, more preferably from 5 to 25 mPa·s, and more preferably from 8 to 15 mPa·s at 25 degrees C. to enhance the print density and text quality and achieve good dischargeability. Viscosity can be measured by equipment such as a rotatory viscometer, RE-80L, manufactured by TOKI SANGYO CO., LTD. The measuring conditions are as follows:

Standard cone rotor (1°34'×R24)
Sample liquid amount: 1.2 mL
Rate of rotation: 50 rotations per minute (rpm)
25 degrees C.
Measuring time: three minutes.

The surface tension of the ink is preferably 35 mN/m or less and more preferably 32 mN/m or less at 25 degrees C. because the ink suitably levels on a recording medium and the ink dries in a short time.

The ink preferably has a pH of from 7 to 12 and more preferably from 8 to 11 to prevent corrosion of metal material in contact with liquid.

Polyurethane Resin

The polyurethane resin mentioned above has a glass transition temperature Tg of 0 degrees C. or lower.

The polyurethane resin is preferably a urethane resin emulsion (resin particles) with a basic structure of ester.

With such a polyurethane resin emulsion with a basic structure of ester with a glass transition temperature Tg of 0 degrees C. or lower, images obtained have excellent robustness and texture. Robustness in the present disclosure refers to color fastness to washing and laundering according to JIS L0844 format. Texture refers to softness of an image obtained.

It is possible to obtain an ink by mixing a resin emulsion in which such resin particles are dispersed in water as a dispersion medium with materials, such as a coloring material and an organic solvent. The resin particle can be synthesized or procured. The resin particle can be used alone or two or more types of the resin particles can be used in combination.

The volume average particle diameter (mean volume diameter) of the resin particle is not particularly limited and can be suitably selected to suit to a particular application. The mean volume diameter is preferably from 10 to 2,000 nm, more preferably from 10 to 200 nm, and particularly preferably from 10 to 100 nm to achieve a good fixability and image hardness.

The volume average particle diameter can be measured by using a device such as a particle size analyzer (Nanotrac Wave-UT151, manufactured by MicrotracBEL Corp.).

The proportion of the polyurethane resin is not particularly limited and can be suitably selected to suit to a particular application. It is preferably from 1 to 30 percent by mass and more preferably from 5 to 20 percent by mass to the entire of ink to achieve good robustness and storage stability of the ink.

Water

The proportion of water in the ink is not particularly limited and it can be suitably selected to suit to a particular application. It is preferably from 10 to 90 percent by mass and more preferably from 20 to 60 percent by mass to enhance the drying property of the processing fluid mentioned above.

Additive (Optional Component)

The ink may further optionally include additives such as a surfactant, defoaming agent, preservative and fungicide, corrosion inhibitor, and pH regulator.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, surfactants not decomposable in a high pH environment are preferable.

Examples include, but are not limited to, side chain modified polydimethyl siloxane, both terminal-modified polydimethyl siloxane, one-terminal-modified polydimethyl siloxane, and side-chain-both-terminal-modified polydimethyl siloxane. Silicone-based surfactants having a polyoxyethylene group or a polyoxyethylene polyoxypropylene group as a modification group are particularly preferable because such an aqueous surfactant demonstrates good properties.

It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carbonic acid compounds include, but are not limited to, perfluoroalkyl carbonic acid and salts of perfluoroalkyl carbonic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain.

Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surface active agents include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both terminal-modified polydimethyl siloxane, one-terminal-modified polydimethyl siloxane, and side chain both-terminal-modified polydimethyl siloxane. Of these, a polyether-modified silicone-based surfactant having a polyoxyethylene group or a polyoxyethylene polyoxypropylene group is particularly preferable because such a surfactant demonstrates good property as the aqueous surfactant.

Such surfactants can be synthesized or procured.

Products can be procured from BYK-Chemie GmbH, Shin-Etsu Silicone Co., Ltd., Dow Corning Toray Co., Ltd., NIHON EMULSION Co., Ltd., Kyoeisha Chemical Co., Ltd., and others.

The polyether-modified silicon-based surfactant has no particular limit and can be suitably selected to suit to a particular application. For example, a compound is usable in which the polyalkylene oxide structure represented by the following Chemical Formula S-1 is introduced into the side chain of the Si site of dimethyl polysiloxane.

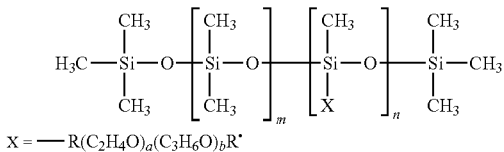

Chemical Formula S-1

In Chemical Formula S-1, "m", "n", "a", and "b" each, respectively independently represent integers, R represents an alkylene group, and R' represents an alkyl group.

Specific examples of the polyether-modified silicone-based surfactant include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because these do not readily foam and the fluorochemical surfactant represented by the following Chemical Formula F-1 or Chemical Formula F-2 is preferable.

$$CF_3CF_2(CF_2CF_2)_m\!-\!CH_2CH_2O(CH_2CH_2O)_n H$$

Chemical Formula F-1

In the compound represented by Chemical Formula F-1, "m" is preferably 0 or an integer of from 1 to 10 and "n" is preferably 0 or an integer of from 1 to 40.

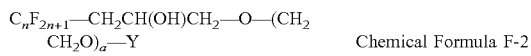

Chemical Formula F-2

In the compound represented by the Chemical Formula F-2, Y represents H or $C_mF_{2m+1}$, where n represents an integer of from 1 to 6, or $CH_2CH(OH)CH_2$—$C_mF_{2m+1}$, where m represents an integer of from 4 to 6, or $C_pH_{2p+1}$, where p is an integer of from 1 to 19. n represents an integer of from 1 to 6. a represents an integer of from 4 to 14.

The fluorochemical surfactant can be procured.

Specific examples of the procurable products include, but are not limited to, SURFLON S-111, SURFLON S-112, SURFLON S-113, SURFLON S-121, SURFLN S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by Sumitomo 3M Limited); MEGAFACE F-470, F-1405, and F-474 (all manufactured by DIC CORPORATION); ZONYL™ TBS, FSP, FSA, FSN-100, FSN, FSO-100, FSO, FS-3100, UR, CAPSTONE® FS-30, FS-31, FS-300, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (manufactured by DAIKIN INDUSTRIES).

The content of the surfactant in a processing fluid is not particularly limited and can be selected to suit to a particular application.

Defoaming Agent

The defoaming agent has no particular limit. Examples include, but are not limited to silicon-based defoaming agents, polyether-based defoaming agents, and aliphatic acid ester-based defoaming agents. These can be used alone or in combination. Of these, silicone-based defoaming agents are preferable to enhance the ability of braking foams.

Preservatives and Fungicides

The preservatives and fungicides are not particularly limited. One specific example is 1,2-benzisothiazoline-3-one.

Corrosion Inhibitor

The corrosion inhibitor has no particular limit. Specific examples include, but are not limited to, acid sulfites and sodium thiosulfates.

pH Regulator

The pH regulator has no particular limit as long as it can control pH to 7 or greater. It includes, but are not limited to, amines such as diethanol amine and triethanol amine.

Ink's Property

Properties of the ink are not particularly limited and they can be suitably selected to suit to a particular application. The ink preferably has properties, such as viscosity, surface tension, and pH, in the following ranges.

The ink preferably has a viscosity of from 5 to 30 mPa·s and more preferably from 5 to 25 mPa·s at 25 degrees C. to enhance the print density and text quality and achieve good dischargeability. Viscosity can be measured by equipment such as a rotatory viscometer, RE-80L, manufactured by TOKI SANGYO CO., LTD. The measuring conditions are as follows:

Standard cone rotor (1°34'×R24)
Sample liquid amount: 1.2 mL
Rate of rotation: 50 rotations per minute (rpm)
25 degrees C.
Measuring time: three minutes.

The surface tension of ink is preferably 35 mN/m or less and more preferably 32 mN/m or less at 25 degrees C. because the ink suitably levels on a printing medium and the ink dries quickly.

The ink preferably has a pH of from 7 to 12 and more preferably from 8 to 11 to prevent corrosion of metal material in contact with liquid.

One way of quantitatively and qualitatively analyzing the organic solvents, resin, coloring materials, and other components contained in ink is to utilize a method such as gas chromatography mass spectrometry (GC-MS). One of the measuring devices by GC-MS is GCMS-QP 2020NX, manufactured by Shimadzu Corporation.

The moisture contained in the ink can be measured by an available method, such as quantitative analysis of the volatile components by GC-MS or mass variation by thermogravimeter-differential thermal analysis (TG-DTA).

Ink Discharging Unit and Ink Discharging

The ink discharging unit includes a nozzle plate with a liquid repellent layer containing a silicone resin and discharges the ink contained in an ink container to a printing medium.

Ink discharging refers to discharge the ink mentioned above.

The ink discharging unit and ink discharging preferably apply the ink to regions of a printing medium where the processing fluid, which is described layer, is applied.

The ink discharging device and the ink discharging unit in the method of discharging an ink of the present disclosure include a nozzle plate with a liquid repellent layer containing a silicone resin.

The liquid repellent layer can be a film of a single layer or a laminate of two or more layers.

The method of forming the liquid repellent layer containing a silicone resin on a nozzle plate is not particularly limited and can be suitably selected to suit to a particular application. One way of forming the layer is according to the method disclosed in Japanese Unexamined Patent Application Publication No. 2020-117683.

The average thickness of the liquid repellent layer of a silicone resin is preferably from 0.1 to 1 μm and more preferably from 0.5 to 1.0 μm.

The ink discharging unit is not particularly limited and can be suitably selected to suit to a particular application. The liquid discharging heads disclosed in Japanese Patent No. 4936738 and Japanese Unexamined Patent Application Publication No. 2020-117683 can be used as the ink discharging unit.

Liquid Discharging Head

An example of the liquid discharging head is described with reference to FIG. 3 to FIG. 6. The liquid discharging head can be selected among known liquid discharging heads. The liquid discharging head is not thus limited to that illustrated in FIG. 3 to FIG. 6.

Figure 3:
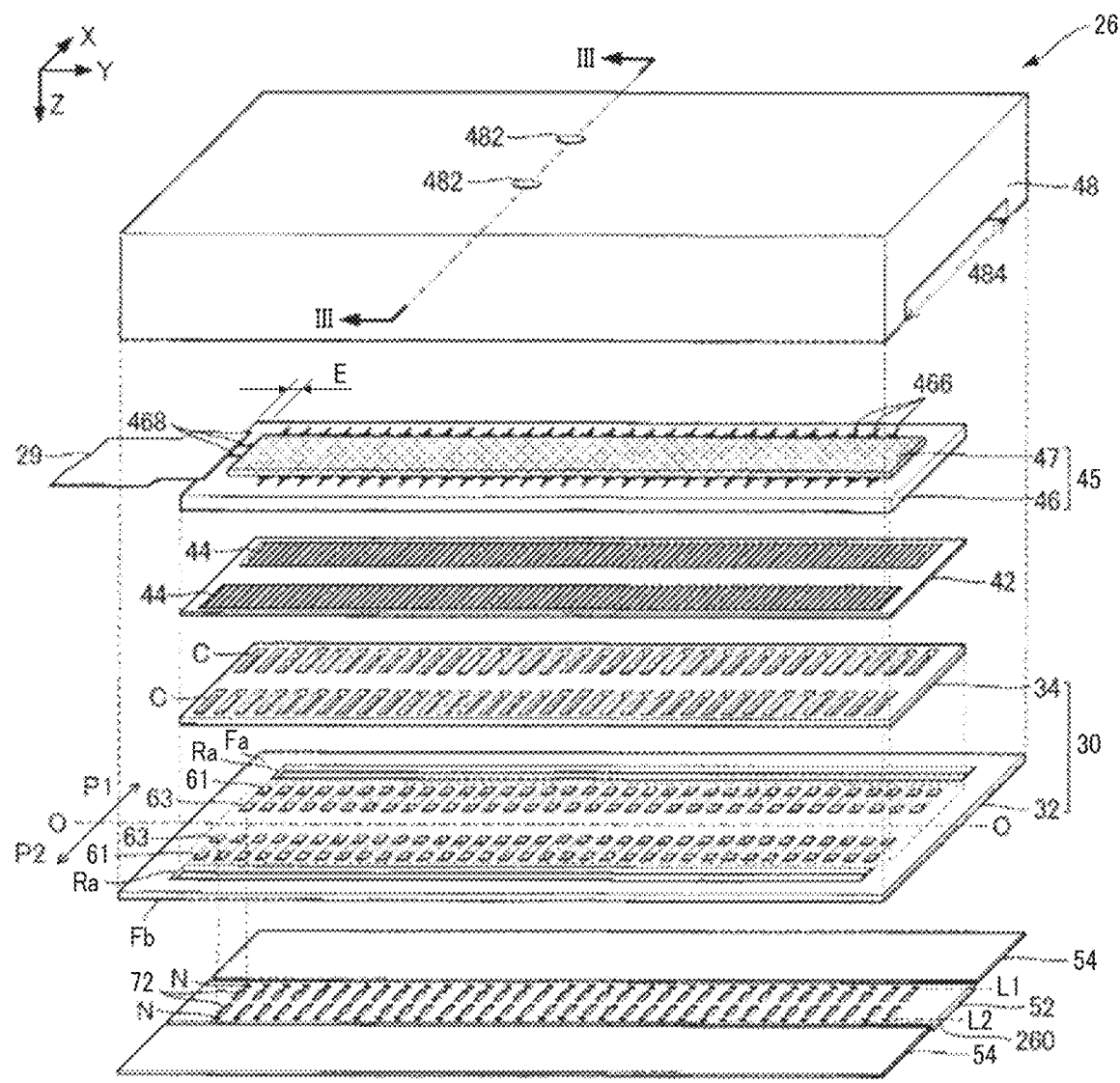
FIG. 3 is a diagram illustrating an exploded perspective view of an example of a liquid discharging head.
Figure 4:
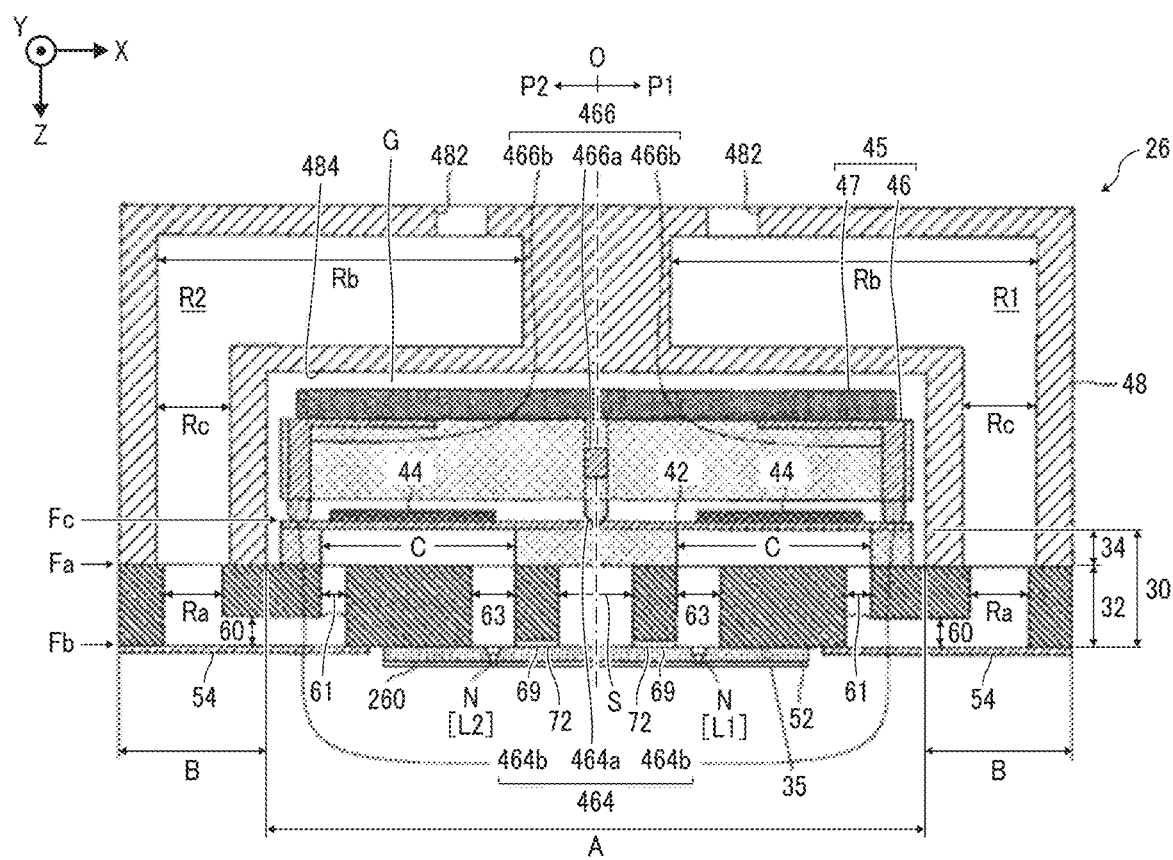
FIG. 4 is a diagram illustrating a cross sectional view of the liquid discharging head illustrated in FIG. 3 at the line perpendicular to the Y direction.
Figure 5:
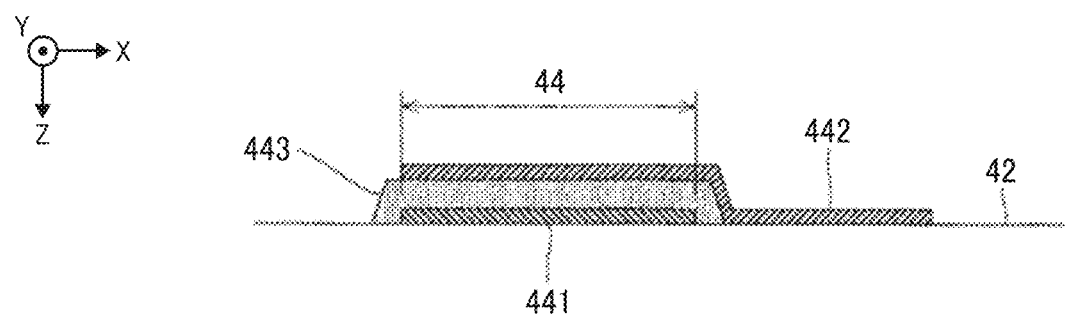
FIG. 5 is a schematic diagram illustrating a cross sectional view of an example of a piezoelectric element.

FIG. 3 is a diagram illustrating an exploded perspective view of a liquid discharging head 26. FIG. 4 is a diagram illustrating a cross-sectional view of a liquid discharging head 26 illustrated in FIG. 3 at line perpendicular to the Y direction. FIG. 5 is a diagram illustrating a cross-sectional view of a piezoelectric element 44.

As illustrated in FIGS. 3 and 4, the liquid discharging head 26 of the present embodiment is configured to have the elements related to each nozzle N in a first nozzle line L1 and the elements related to each nozzle N in a second nozzle line L2 symmetrically with an imaginary plane O therebetween. The positive portion (hereinafter referred to as the first portion) P1 in the X direction and the negative portion (hereinafter referred to as second portion) P2 in the X direction with the imaginary plane O have the substantially same structure in the liquid discharging head 26. A plurality of nozzles N in the first nozzle line L1 are formed in the first portion P1 and a plurality of nozzles N in the second nozzle line L2 are formed in the second portion P2. The imaginary plane O corresponds to the boundary plane between the first portion P1 and the second portion P2.

The liquid discharging head 26 includes a first channel member 30 and a second channel member 48.

The first channel member 30 is a structure to form a flow path through which ink is supplied to the plurality of nozzles N. The first channel member 30 and the second channel member 48 are laminated on each other in the Z direction. The first channel member 30 is formed by laminating a communication plate 32, a pressure chamber substrate 34, and a diaphragm 42. The communication plate 32, the pressure chamber substrate 34, and the diaphragm 42 each are a plate-like member long in the Y direction.

As illustrated in FIG. 3, the surface of the first channel member 30 on the negative side in the Z direction includes a first region A laminated on the second channel member 48 via a wiring substrate 45 and the second region B laminated on the second channel member 48, not via the wiring substrate 45. The communication plate 32 is disposed over the first region A and the second region B. The pressure chamber substrate 34 and the diaphragm 42 in FIG. 3 are jointed in this sequence to a surface Fa (upper surface) of the communication plate 32 on the negative side in the Z direction with an adhesive and disposed in the first region A, for example.

In addition to the pressure chamber substrate 34 and the diaphragm 42, a plurality of piezoelectric elements 44, the wiring substrate 45, and the second channel member 48 are disposed on the surface Fa of the communication plate 32. The plurality of piezoelectric elements 44 and the wiring substrate 45 are disposed on the surface of the diaphragm 42 on the negative side in the Z direction and arranged in the first region A. The second channel member 48 is superposed on the first channel member 30 in the first region A and the second region B. The second channel member 48 is bonded to the second region B in the surface Fa of the communication plate 32 with a substance such as an adhesive.

The configuration of the plurality of the piezoelectric elements 44 and the wiring substrate 45 are detailed later.

On the other hand, a nozzle plate 52 and a vibration absorber 54 are disposed on the positive side of the communication plate 32 in the Z direction, i.e., the opposite side to the surface Fa. Each element of the liquid discharging head 26 is schematically a plate-like structure long in the Y direction like the communication plate 32 and the pressure chamber substrate 34 and bonded with a substance such as an adhesive. Each plate-like element of the liquid discharging head 26 is laminated on the surface of each plate-like element perpendicularly along the Z direction. The Z direction corresponds to the direction of laminating the communication plate 32 and the pressure chamber substrate 34 and the direction of laminating the communication plate 32 and the nozzle plate 52, for example.

The nozzle plate 52 is a plate-like member with the multiple nozzles N formed thereon and is bonded to the surface Fb of the communication plate 32 with a substance such as an adhesive. The surface opposite the surface of the nozzle plate 52 on the side of the communication plate 32 is a discharging surface 260 facing a medium M. Each of the plurality of nozzles N is a tubular through hole piercing from the discharging surface 260 to the surface on the side of the communication plate 32. The plurality of nozzles N constituting the first nozzle line L1 and the plurality of nozzles N constituting the first nozzle line L2 are formed on the nozzle plate 52. Of the nozzle plate 52, the plurality of nozzles N of the first nozzle line L1 are formed along the Y direction on the positive region in the X direction from the imaginary plane O and the plurality of nozzles N of the second nozzle line L2 are formed along the Y direction on the negative region in the X direction. The nozzle plate 52 is a continuous plate-like member over the portion of the plurality of nozzles N of the first nozzle line L1 to the portion of the plurality of nozzles N of the second nozzle line L2. The nozzle plate 52 is manufactured by processing a monocrystal substrate of silicon utilizing a semiconductor manufacturing technology, including a processing technology, such as dry etching or wet etching.

Known materials and methods can be suitably used to manufacture the nozzle plate 52.

Figure 2:
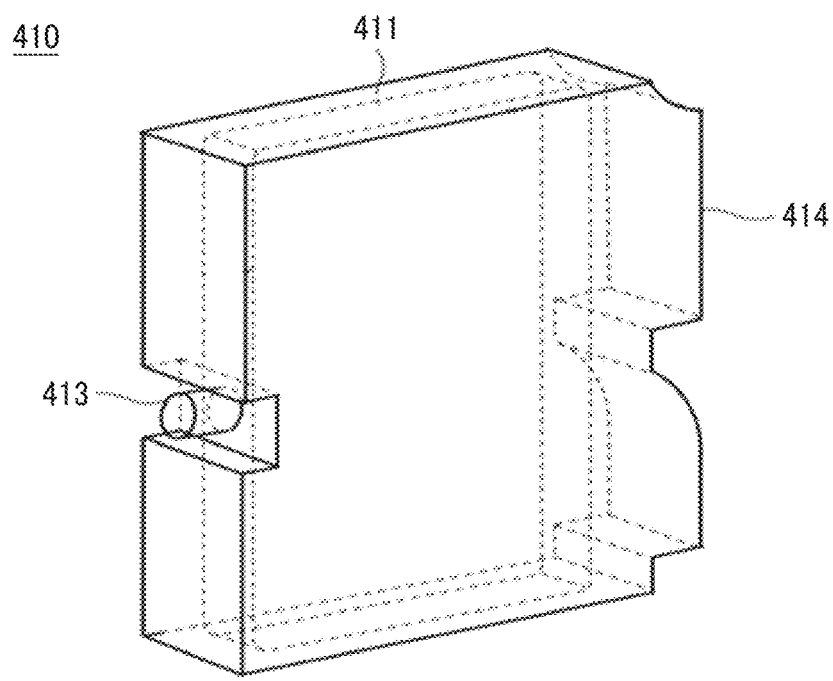
FIG. 2 is a schematic diagram illustrating an example of a processing fluid container and an ink container according to an embodiment of the present invention.

As illustrated FIGS. 2 and 3, the communication plate 32 includes a space Ra, a supplying liquid chamber 60, a plurality of supplying channels 61, and a plurality of communication paths 63 formed for each of the first portion P1 and the second portion P2. The space Ra is an aperture long along the Y direction from a planar view, i.e., viewed from the Z direction. The supplying channel 61 and the communication path 63 are through holes formed for each of the nozzles N. The supplying liquid chamber 60 is a space formed long in the Y direction over the plurality of nozzles N. The supplying liquid chamber 60 mutually communicates the space Ra and the plurality of supplying channels 61. The plurality of the communication paths 63 are arranged in the Y direction in a planar view. The plurality of supplying channels 61 are arranged in the Y direction between the plurality of the communication paths 63 and the space Ra. The plurality of the supplying channels 61 mutually communicate with the space Ra. Any of the communication paths 63 superposes the corresponding nozzle N in a planar view. Specifically, any of the communication paths 63 in the first portion P1 communicates with a nozzle N corresponding to any of the communication paths 63 of the first nozzle line L1. Similarly, any of the communication paths 63 in the second portion P2 communicates with a nozzle N corresponding to any of the communication paths 63 of the second nozzle line L2.

The pressure chamber substrate 34 is a plate-like member including a plurality of pressure cavities C formed for each of the first portion P1 and the second portion P2. The plurality of the pressure cavities C are arranged in the Y direction. Each of the pressure cavities C is formed for each of the nozzles N and it is a space long in the X direction in a planar view. Like the nozzle plate 52 mentioned above, the communication plate 32 and the pressure chamber substrate 34 can be manufactured by processing a monocrystal substrate of silicon utilizing a semiconductor manufacturing technology.

Available materials and methods can be employed to manufacture the communication plate 32 and the pressure chamber substrate 34.

As described above, the first channel member 30 (the communication plate 32 and the pressure chamber substrate 34) and the nozzle plate 52 enclose the substrate made of silicon.

Therefore, the first channel member 30 and the nozzle plate 52 can include fine paths with high precision by utilizing the semiconductor manufacturing technology described above.

The diaphragm 42 is disposed on the surface of the pressure chamber substrate 34 opposite the communication plate 32. The diaphragm 42 is a flexible vibration plate.

The pressure chamber substrate 34 and the diaphragm 42 can be integrally formed by partially and selectively removing the region corresponding to the pressure cavity C of the plate-like member with a particular thickness along the thickness direction. The diaphragm 42 can be configured by a Si layer or a laminate with layers containing a Si layer. The laminate with layers containing a Si layer includes a laminate of a Si layer and a $SiO_2$ layer and a laminate of a Si layer, a $SiO_2$ layer, and $ZrO_2$ layer.

The surface Fa of the communication plate 32 and the diaphragm 42 face each other spaced apart inside each pressure cavity C. The pressure cavity C is a space between the surface Fa of the communication plate 32 and the diaphragm 42, The pressure cavity C changes the pressure to the space filled with the ink. Each pressure cavity C is a space long in the X direction. The pressure cavity C is individually formed for each nozzle N. The plurality of pressure cavities C are arranged in the Y direction for each of the first nozzle line L1 and the second nozzle line L2.

In the configuration illustrated in FIGS. 2 and 3, the end of any of the pressure cavities C on the side of the imaginary plane O superposes the communication paths 63 in a planar view. The other end opposite the imaginary plane O superposes the supplying channel 61 in a planar view. Therefore, the pressure cavity C communicates with the nozzle N via the communication path 63 in each of the first portion P1 and the second portion P2. It also communicates with the space Ra via the supplying channel 61.

It is possible to add a particular resistance by forming a path squeezed to have a narrow path on the pressure cavity C.

A plurality of piezoelectric elements 44 corresponding to different nozzles N are disposed on the surface of the diaphragm 42 on the side opposite the pressure cavity C for each of the first portion P1 and the second portion P2 as illustrated in FIGS. 2 and 3. The piezoelectric element 44 is a passive element deformed on the supply of a drive signal. The plurality of piezoelectric elements 44 are arranged in the Y direction in accordance with each pressure cavity C. When the diaphragm 42 vibrates at the deformation of the piezoelectric element 44 that has received a drive signal, the pressure in the pressure cavity C corresponding to the piezoelectric element 44 changes. Due to this change, the ink in the pressure cavity C passes the communication path 63 and the nozzle N, and is discharged.

Any of the piezoelectric elements 44 is a drive element formed of a laminate including a first electrode 441 and the second electrode 442 facing each other with a piezoelectric element layer 443 therebetween as illustrated in FIG. 4. The portion where the first electrode 441, the second electrode 442, and the piezoelectric element layer 443 superpose in a planar view functions as the piezoelectric element 44.

The portion deformed on the supply of a drive signal, i.e., the active portion that vibrates the diaphragm 42, can be the piezoelectric element 44.

One of the first electrode 441 and the second electrode 442 is set to be a continuous common electrode over the plurality of piezoelectric elements 44. The other can be set as individual electrodes to the plurality of piezoelectric element 44.

In the present embodiment, the first electrode 441 is used as a common electrode and the second electrode 442 is used as an individual electrode.

The wiring structure that drives the piezoelectric element 44 is described later.

The second channel member 48 illustrated in FIGS. 2 and 3 is a housing member for storing ink supplied to the plurality of pressure cavities C or the plurality of nozzles N.

The surface of the second channel member 48 on the positive side in the Z direction is attached to the surface Fa of the communication plate 32 with a substance such as an adhesive. The second channel member 48 is formed of a material different from that for the first channel member 30. The second channel member 48 can be manufactured by ejection molding of a resin material, for example.

As illustrated in FIG. 3, the second channel member 48 includes a space Rb and a space Rc long in the Y direction for each of the first portion P1 and the second portion P2. The space Rc is longer in the Z direction than the space Rb. The space Rb is longer in the X direction than the space Rc. The space Rc extends from the space Rb to the space Ra of the communication plate 32, communicating the space Rb with the space Rc. The space formed of the space Ra, the space Rb, and the space Rc form a circulation path for circulating the ink in the plurality of pressure cavities C. This circulation path functions as a common liquid chamber, or a reservoir, for supplying the ink to the plurality of pressure cavity C.

In the present embodiment, a first circulation path R1 is formed of the space constituted of the space Ra, the space Rb, and the space Rc on the side of the first portion P1 and the circulation path R2 is formed of the space constituted of the space Ra, the space Rb, and the space Rc on the side of the second portion P2.

The first circulation path R1 supplies the ink to the plurality of pressure cavities C on the side of the first portion P1 and the second circulation path R2 supplies the ink to the plurality of pressure cavities C on the side of the second portion P2.

The first circulation path R1 is situated on the positive side of the imaginary plane O in the X direction and the second circulation path R2 is situated on the negative side of the imaginary plane O in the X direction. A connecting port 482 for introducing the ink supplied from the liquid container 14 to the first circulation path R1 and another connecting port 482 for introducing the ink supplied from the liquid container 14 to the second circulation path R2 are formed on the surface of the second channel member 48 on the side opposing the communication plate 32. The ink in the first circulation path R1 is supplied to the pressure cavity C on the side of the first portion P1 via the supplying liquid chamber 60 on the first portion P1 and each supplying channel 61. The ink in the second circulation path R2 is supplied to the pressure cavity C on the side of the second portion P2 via the supplying liquid chamber 60 on the side of the second portion P2 and each supplying channel 61.

The vibration absorbers 54 are disposed on the surface Fb of the communication plate 32 for each of the first portion P1 and the second portion P2. The vibration absorber 54 is made of a flexible film (compliance substrate). The vibration absorber 54 of the first portion P1 absorbs the pressure change of the ink in the first circulation path R1. The vibration absorber 54 of the second portion P2 absorbs the pressure change of the ink in the second circulation path R2. As illustrated in FIG. 3, the vibration absorber 54 of the first portion P1 is disposed on the surface Fb of the communication plate 32 to block the space Ra of the communication plate 32 of the first portion P1 and the plurality of supplying channels 61. The vibration absorber 54 of the first portion P1 forms a wall, specifically, a base, of the first circulation path R1. The vibration absorber 54 of the second portion P2 is disposed on the surface Fb of the communication plate 32 to block the space Ra of the communication plate 32 of the second portion P2 and the plurality of supplying channels 61. The vibration absorber 54 of the second portion P2 forms a wall, specifically, a base, of the first circulation path R2.

A circulation liquid chamber S is formed on the surface Fb of the communication plate 32 facing the nozzle plate 52.

The circulation liquid chamber S is a hole with a base (void) extending in the Y direction in a planar view. The aperture of the circulation liquid chamber S is blocked by the nozzle plate 52 bonded to the surface Fb of the communication plate 32. The circulation liquid chamber S is a part of the circulation path for circulating the ink between the pressure cavity C of the first portion P1 and the first circulation path R1 and between the second portion P2 and the second circulation path R2. The circulation liquid chamber S functions as the circulation path for letting the ink out from the pressure cavity C of the first portion P1 and the pressure cavity C of the second portion P2. The connecting port 482 can be disposed on the surface of the second channel member 48 opposite the communication plate 32 to let the ink from the circulation liquid chamber S out through the connecting port 482.

Figure 6:
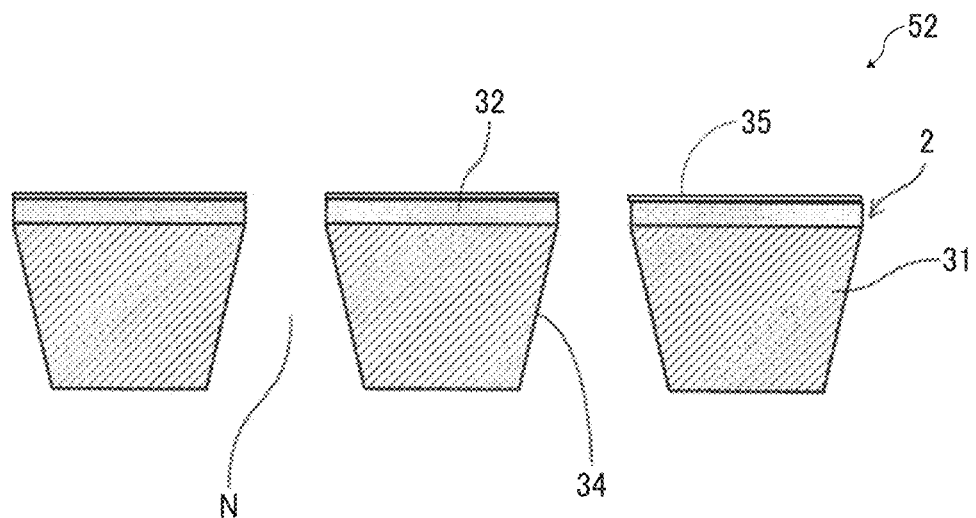
FIG. 6 is a diagram illustrating an enlarged cross sectional view of the nozzle plate of the liquid discharging head.

The nozzle plate 52 as a nozzle forming member in this liquid discharging head is described with reference to FIG. 6. The nozzle plate 52 is formed by applying a resin to the surface of the nozzle substrate 31 formed of a Ni metal plate with nozzle orifices 4 formed as the nozzles N. The liquid repellent layer 35 is thus formed on the nozzle plate 52. The resin forming the liquid repellent layer 35 is preferably a silicone resin. The nozzle plate 52 includes a vibration plate 2 including the diaphragm 42.

The silicone resin in the present disclosure refers to a polymer with a main chain formed of a siloxane bond.

The silicone resin for forming the liquid repellent layer 35 can be applied in an atmosphere when a liquidized silicone resin curing at room temperature is used. Using a liquidized silicone resin accompanying hydrolysis is particularly preferable.

The nozzle substrate 31 is not limited to a Ni metal plate. A substrate formed by piecing a resin material, such as polyimide, with an excimer laser to form nozzle orifices. Alternatively, a laminate of a metal material and a resin material can be used. A rigid nozzle plate is obtained when a metal material is used for the nozzle substrate 31. A substrate made of a resin material demonstrates good attachability to the liquid repellent layer 35 and achieves good durability.

The average thickness of the liquid repellent layer 35 is preferably less than 10 μm and more preferably from 0.1 to 1 μm considering the impact on resistance to wiping, liquid repellency, and liquid discharging. The liquid repellent layer 35 achieves good liquid repellency when it has a surface roughness Ra of 0.2 μm or less.

A liquid discharging head with the liquid repellent layer 35 formed of a silicone resin achieves good liquid repellency to ink containing a fluorine compound. A liquid discharging head formed of a fluorine resin involves a problem of liquid repellency to ink containing a fluorine compound. However, obtaining a sufficient liquid repellency to ink containing a fluorine compound is possible using a liquid repellent layer of a silicone resin.

Container for Processing Fluid

The processing fluid container contains a processing fluid.

In other words, the processing fluid is present in the processing fluid container.

The processing fluid container is not particularly limited. It includes a container of a liquid composition for use in a discharging or applying method.

An available ink cartridge can be used as the container for discharging.

Specific examples of container for use in applying include, but are not limited to, known containers of a liquid composition for use in blade coating, gravure coating, gravure offset coating, wire-bar coating, bar coating, roll coating, knife coating, air knife coating, comma coating, U comma coating, AKKU coating, smoothing coating, MICROGRAVURE™ coating, reverse roll coating, four or five roll coating, dip coating, curtain coating, slide coating, and die coating.

Processing Fluid

The processing fluid contains a multivalent metal salt and water. It may furthermore optionally contain an organic solvent, a resin, and an additive.

The purpose of the processing fluid is not particularly limited. Preferably, a liquid used as a processing fluid is applied to a printing medium before ink containing a coloring material and other substances is applied thereto.

Multivalent Metal Salt

When the processing fluid is brought into contact with the ink, the multivalent metal salt associates by electric charge action with the coloring material in the ink. Then the coloring material agglomerates and is separated from the liquid phase, thereby promoting attaching the coloring material to the printing medium.

The coloring material thus stays even on the surface of a printing medium with a large void ratio by forming an aggregate layer due to the multivalent metal salt in the processing fluid. Resultantly, the images obtained demonstrate a high degree of whiteness and coloring.

High quality images can be formed even on a printing medium with poor ink absorbency because beading is minimized.

Unlike a coagulant such as a cationic polymer, the multivalent metal salt inhibits the processing fluid from attaching to a member when the member contacts the region of a printing medium where the processing fluid is applied but the ink is not discharged yet.

Examples include, but are not limited to, salts of titanium compounds, chromium compounds, copper compounds, cobalt compounds, strontium compounds, barium compounds, iron compounds, aluminum compounds, calcium compounds, magnesium compounds, zinc compounds, and nickel compounds. These can be used alone or in combination of two or more thereof. Of these, in terms of effective aggregation of pigments, salts of calcium compounds, magnesium compounds, and nickel compounds are preferable, and alkali earth metal salts of calcium compounds, magnesium compounds are more preferable.

Specific examples of the magnesium compound include, but are not limited to, magnesium nitrate, magnesium chloride, magnesium sulfate, magnesium silicate, and magnesium acetate.

Specific examples of the calcium compound include, but are not limited to, calcium carbonate, calcium nitrate, calcium chloride, calcium acetate, calcium sulfate, and calcium silicate. One of the barium compounds is barium sulfate. Specific examples of the zinc compound include, but are not limited to, zinc sulfide and zinc carbonate.

Specific examples of the aluminum compound include, but are not limited to, aluminum silicate and aluminum hydroxide. Of these, calcium chloride and calcium nitrate are preferable in terms of solubility in water and effective agglomeration of a pigment.

Hydrates of these compounds can be also used as the multivalent metal salt.

Organic Solvent

The organic solvent for use in the present disclosure is not particularly limited and can be selected to suit to a particular application. It includes, but is not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutyl ether, diethylene glycol monomethylether, diethylene glycol monoethylether, diethylene glycol monobutyl ether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, €-caprolactam, and γ-butyrolactone; amides such as formamide, N-methylformamide, N,N-dimethylformamide, 3-methoxy-N,N-dimethyl propionamide, and 3-buthoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

The content of the organic solvent in processing fluid is not particularly limited and can be suitably selected to suit to a particular application.

Resin

The resin contained in the processing fluid is not particularly limited and can be suitably selected to suit to a particular application. It includes, but is not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins. Resin particles made of such resins can be also used.

It is possible to obtain an ink by mixing a resin emulsion in which such resin particles are dispersed in water as a dispersion medium with materials, such as a coloring material and an organic solvent.

The resin particle can be synthesized or procured. The resin particle can be used alone or two or more types of the resin particles can be used in combination.

There is no specific limitation to the volume average particle diameter of the resin particles and it can be suitably selected to suit to a particular application. The volume average particle diameter can be measured by using a device such as a particle size analyzer (Nanotrac Wave-UT151, manufactured by MicrotracBEL Corp.).

The content of the resin in processing fluid has no particular limit and is selected to suit to a particular application.

Water

The proportion of water in the processing fluid is not particularly limited and it can be suitably selected to suit to a particular application. It is preferably from 10 to 90 percent by mass and more preferably from 20 to 60 percent by mass to enhance the drying property of the processing fluid mentioned above.

Additive (Optional Component)

The processing fluid may furthermore optionally contain the same additives as those the ink mentioned above may furthermore optionally contain.

Device for Applying Processing Fluid and Application of Processing Fluid

The device for applying a processing fluid applies the processing fluid mentioned above in the processing fluid container mentioned above to a printing medium.

In the application of a processing fluid, the processing fluid mentioned above in the processing fluid container mentioned above is applied to a printing medium.

The application of a processing fluid is not particularly limited and can be suitably selected to suit to a particular application. It includes discharging and coating.

This discharging is not particularly limited and can be suitably selected to suit to a particular application. For example, it is possible to discharge processing fluid by using a piezoelectric element actuator, thermal energy, actuator utilizing an electrostatic force, or a continuous jetting charging control head.

Specific examples of coating include, but are not limited to, blade coating, gravure coating, gravure offset coating, wire-bar coating, bar coating, roll coating, knife coating, air knife coating, comma coating, U comma coating, AKKU coating, smoothing coating, MICROGRAVURE™ coating, reverse roll coating, four or five roll coating, dip coating, curtain coating, slide coating, and die coating.

The amount of a processing fluid applied to a printing medium is preferably from 10 to 50 mg/cm$^2$ and more preferably from 20 to 40 mg/cm$^2$ in the application of a processing fluid. An amount of processing fluid applied of 10 mg/cm$^2$ or greater enhances the image quality and an amount of 50 mg/cm$^2$ or less minimizes uneven coloring caused by the precipitation of the solid content of the processing fluid.

Printing Medium

The printing medium is not particularly limited and can be suitably selected to suit to a particular application. It includes a substance such as fabric. As the fabric, cloth, textile, and leather for apparel, such as T-shirts, can be suitably used.

Also, printing media, media, and substrates have the same meaning in the present disclosure unless otherwise specified.

Other Optional Device and Other Optional Step

The other optional devices are not particularly limited and can be suitably selected to suit to a particular application. They include, but are not limited to, a post-processing device, a first drying device, and a second drying device.

The other optional processes are not particularly limited and can be suitably selected to suit to a particular application. They include, but are not limited to, post-processing, first drying, and second drying.

Post-Processing Device and Post-Processing

The post-processing device is to apply a post-processing fluid.

In the post-processing, a post-processing fluid is applied.

The post-processing fluid is not particularly limited as long as a transparent layer can be formed with the post-processing fluid.

Materials such as organic solvents, water, resins, surfactants, defoaming agents, pH regulators, preservatives and fungicides, and corrosion inhibitors are suitably selected based on a necessity basis and mixed to obtain post-processing fluid.

The post-processing fluid can be applied to the entire printing region formed on a printing medium or only the region on which an ink image is formed.

The method of applying the post-processing fluid is not particularly limited. The same method as that of applying the processing fluid can be used.

First Drying Device and First Drying

The first drying device dries a printing medium on which the processing fluid is applied.

In the first heating, the printing medium on which the processing fluid mentioned above is applied is dried.

The printing medium on which the processing fluid is applied can be dried by drying (also referred to as first drying) after the application of the processing fluid.

The processing fluid applied to the printing medium is dried during the first drying.

The first drying device and first drying are not particularly limited as long as they can dry a printing medium. It is preferably heating.

The heating temperature during the first heating is preferably 60 degrees C. or higher and more preferably 80 degrees C. or higher, and furthermore preferably 100 degrees C. or higher.

The first drying device is not particularly limited. Any available heating device can be used as the first drying device. A device such as a roll heater, drum heater, fan heater, or heat press can be used to dry by heating.

Second Heating Device and Second Heating

The second drying device dries a printing medium on which the processing fluid and the ink are applied after the ink is discharged.

In the second heating, the printing medium on which the processing fluid and the ink mentioned above are applied is dried after the ink is discharged.

The processing fluid and ink applied onto a printing medium are dried during the second heating.

The second drying device and second drying are not particularly limited as long as they can dry a printing medium. It is preferably heating.

The heating temperature during the second drying is preferably 60 degrees C. or higher and more preferably 80 degrees C. or higher, and furthermore preferably 100 degrees C. or higher.

The second drying device is not particularly limited and can be selected from available heating devices. It includes a roll heater, a drum heater, a heated wind generator, and heat pressing device.

The ink discharging device of the present disclosure can be suitably used for a printing device employing inkjet printing, such as a printer, facsimile machine, photocopier, multifunction peripheral (serving as a printer, a facsimile machine, and a photocopier), and solid freeform fabrication device such as a 3D printer and additive manufacturing device.

In the present disclosure, the ink discharging device and the method of discharging ink respectively represent a device capable of discharging fluid such as ink and processing fluid to a printing medium and a method of conducting printing utilizing the device. The printing medium refers to an item to which ink or processing fluids can be temporarily or permanently attached. Furthermore, in addition to the desktop type, this printing device includes an ink discharging device capable of printing images on a wide printing medium having, for example, A0 size, and a continuous printer capable of using continuous paper rolled up in a roll-like form as a printing medium.

FIG. 1 is a diagram illustrating an example of the image forming apparatus including the ink discharging device of the present disclosure.

It is possible to apply the ink and the pre-processing fluid by using a single printing device or separate printing devices.

An image forming apparatus 100 illustrated in FIG. 1 includes a pre-processing fluid applying unit 110, an ink discharging unit 120, a post-processing fluid applying unit 130, a drying unit 140, and a conveyance unit 150. The pre-processing fluid applying unit 110 applies a pre-processing fluid to a printing medium M.

The pre-processing fluid applying unit 110, the post-processing fluid applying unit 130, the drying unit 140, and the conveyance unit 150 can be omitted.

Methods of applying pre-processing fluid are not particularly limited.

Specific examples include, but are not limited to, inkjetting, roller coating, gravure coating, gravure offset coating, bar coating, roll coating, knife coating, air knife coating, comma coating, U comma coating, AKKU coating, smoothing coating, MICROGRAVURE™ coating, reverse roll coating, four or five roll coating, dip coating, curtain coating, slide coating, and die coating.

The pre-processing fluid applying unit 110 can be omitted since printing can be conducted by an image forming apparatus after manually applying a pre-processing fluid to a printing medium by a method such as bar coating.

The printing medium M for use in printing is not particularly limited.

Specific examples include, but are not limited to, plain paper, glossy paper, special paper, cloth, film, transparent sheets, and printing paper for general purposes.

The ink discharging unit 120 discharges an inkjet ink to the surface of the printing medium M where the pre-processing fluid has been applied.

The ink discharging unit 120 can be any known inkjet head.

The ink discharging unit 120 can be a head for discharging ink of any color. Heads for discharging ink of color like Y (yellow), M (magenta), C (cyan), K (black), and W (white) can be optionally disposed.

The post-processing fluid applying unit 130 applies post-processing fluid to a region of the surface of the printing medium M where the inkjet ink has been applied. The post-processing fluid applying unit 130 can be a spray or a roller in addition to an inkjet head.

The post-processing fluid applying unit 130 can be omitted.

Methods of applying post-processing fluid are not particularly limited.

Specific examples include, but are not limited to, inkjetting, roller coating, gravure coating, gravure offset coating, bar coating, roll coating, knife coating, air knife coating, comma coating, U comma coating, AKKU coating, smoothing coating, micro gravure coating, reverse roll coating, four or five roll coating, dip coating, curtain coating, slide coating, and die coating.

The drying unit 140 dries the printing medium M with heated wind onto which the post-processing fluid is already applied. The drying unit 140 can be omitted if there is no post-processing fluid applying unit.

The drying unit 140 can use infrared, microwave, a roll heater for heating instead of heated wind and drying the printing medium M onto which the post-processing fluid is already applied. It is also possible to naturally dry the printing medium M onto which the post-processing fluid is already applied without operating the drying unit 140.

The conveyance unit 150 conveys the printing medium M.

There is no specific limit to the conveyance unit 150 as long as it can convey the printing medium M. The conveyance unit 150 can be a conveyance belt or a platen.

The image forming apparatus 100 may furthermore include a fixing unit to heat-fix an image formed on the printing medium M. The fixing unit is not particularly limited. A fixing roller can be used as the fixing unit.

FIG. 2 is a schematic diagram illustrating an example of the processing fluid container or ink container.

A container 411 is housed in a unit such as a plastic container housing unit 414. Each container 410 is used in a form of cartridge. An ink discharging outlet 413 of the container 410 communicates with an inkjet discharging head so that the inkjet discharging head can discharge a processing fluid and white ink to a printing medium.

Method of Manufacturing Ink-discharged Matter and Device for Manufacturing Ink-Discharged Matter The method of manufacturing ink-discharged matter of the present disclosure includes applying a processing fluid containing a multivalent metal salt and water and discharging an ink containing an organic solvent with an SP value of from 9.0 to 12.0, a white pigment, a polyurethane resin with a glass transition temperature Tg of 0 degrees C. or lower, and water from an ink discharging unit, which includes a nozzle plate with a liquid repellent layer containing a silicone resin. The method may furthermore include other optional processes.

The device for manufacturing ink-discharged matter relating to the method of manufacturing ink-discharged matter of the present disclosure includes a processing fluid application device for applying a processing fluid containing a multivalent metal salt and water and an ink discharging unit for discharging an ink containing an organic solvent with an SP value of from 9.0 to 12.0, a white pigment, a polyurethane resin with a glass transition temperature Tg of 0 degrees C. or lower, and water, and other optional devices.

In the present specification, the ink-discharged matter includes an ink and a printing substrate and refers to an item of a substrate with an ink discharged thereonto, including dried matter.

In the ink in the method of manufacturing ink-discharged matter of the present disclosure and the device for manufacturing ink-discharged matter, the proportion of the organic solvent to the entire of the ink is from 0.5 to 2.5 percent by mass and the proportion of the white pigment to the entire of the ink is from 6 to 15 percent by mass.

Each of the above descriptions in common of the ink discharging device and the method of discharging an ink of the present disclosure is suitably and selectively applied for the method of manufacturing ink-discharged matter of the present disclosure and the device for manufacturing ink-discharged matter.

White Ink

The white ink of the present disclosure contains an organic solvent with an SP value of from 9.0 to 12.0, a white pigment, a polyurethane resin with a glass transition temperature Tg of 0 degrees C. or lower, and water, wherein the proportion of the organic solvent to the entire of the ink is from 0.5 to 2.5 percent by mass, wherein the proportion of the white pigment to the entire of the ink is from 6 to 15 percent by mass. It may furthermore contain other optional components.

Each of the above descriptions in common of the ink discharging device and the method of discharging an ink of the present disclosure is suitably and selectively applied for the white ink of the present disclosure.

Set of Processing Fluid and Ink

The set of a processing fluid and an ink of the present disclosure contains the processing fluid containing a multivalent metal salt and water and the ink containing an organic solvent with an SP value of from 9.0 to 12.0, a white pigment, a polyurethane resin with a glass transition temperature Tg of 0 degrees C. or lower, and water, wherein the proportion of the organic solvent to the entire of the ink is from 0.5 to 2.5 percent by mass, wherein the proportion of the white pigment to the entire of the ink is from 6 to 15 percent by mass. It may furthermore contain other optional components.

Each of the above descriptions in common of the ink discharging device and the method of discharging an ink of the present disclosure is suitably and selectively applied for the set of a processing fluid and an ink of the present disclosure.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto. Parts refers to parts by mass and percent refers to percent by mass.

Preparation of Processing Fluid

Preparation of Processing Fluids 1 to 3

Processing fluids 1 to 3 were prepared by mixing and stirring the materials of the prescriptions shown in Table 1.

In Table 1, the amount of a salt containing a hydrated water is represented in parts by mass and the amount of resin particles is represented in parts by mass of a solid content.

TABLE 1

|  |  | Processing fluid | | |
|---|---|---|---|---|
|  |  | 1 | 2 | 3 |
| Organic solvent | Glycerin | 10 | 10 | 10 |
| Metal salt | Calcium chloride dihydrate | 0 | 7.5 | 0 |
|  | Calcium nitrate tetrahydrate | 7.5 | 0 | 0 |
| Other salt | Ammonium lactate | 0 | 0 | 7.5 |
| Surfactant | BYK-348 | 0.5 | 0.5 | 0.5 |
| Resin | Resin emulsion of copolymer of ethylene-vinyl acetate-vinyl | 5 | 5 | 5 |

TABLE 1-continued

| | Processing fluid | | |
|---|---|---|---|
| | 1 | 2 | 3 |
| chloride (SUMIKAFLEX®) 850HQ) | | | |
| Pure water | Balance | Balance | Balance |
| Total | 100 | 100 | 100 |

The details, such as product names and manufacturers, of each material shown in Table 1 are as follows.

Organic Solvent
  Glycerin (manufactured by Tokyo Chemical Industry Co. Ltd.)
Salt
  Calcium nitrate dihydrate (manufactured by FUJIFILM Wako Pure Chemical Corporation)
  Calcium nitrate tetrahydrate (manufactured by FUJIFILM Wako Pure Chemical Corporation)
  Ammonium lactate solution (concentration of 40 percent, manufactured by FUJIFILM Wako Pure Corporation)
Surfactant
  BYK-348 (manufactured by BYK-Chemie GmbH)
Resin Particle
  Resin emulsion of copolymer of ethylene-vinyl acetate-vinyl chloride (SUMIKAFLEX® 850HQ, solid content concentration of 50 percent by mass, manufactured by Sumika Chemtex Company, Limited)

Preparation of White Ink
Preparation of Urethane Resin Emulsion A
The prescription below was placed in a 2 L reaction vessel equipped with a stirrer, a thermometer, a nitrogen sealing tube, and a condenser, followed by uniformly mixing at 60 degrees C.

Recipe
  Methylethylketone: 100 parts
  Polyester polyol obtained from isophtalic acid/adipic acid with a molar ratio of isophthalic acid to adipic acid at 6:4 and ethylene glycol/neopentyl glycol with a molar ratio of ethylene glycol to neopentyl glycol at 1:9, number average molecular weight of 2,000, average number of functional groups of 2:345 parts by mass
  2,2-dimethylol propionic acid (DMPA): 9.92 parts by mass Thereafter, 45.1 parts of triethylene glycol diisocyanate (TEGDI) and 0.08 parts of dioctyltin dilaurate (DOTDL) were added to this liquid mixture to allow reaction at 72 degrees C. for three hours to obtain a polyurethane solution.

To this polyurethane solution, 80 parts by mass of isopropyl alcohol (IPA), 220 parts of methylethyl ketone (MEK), 3.74 parts by mass (TEA), and 596 parts by mass of water were added to change the phase.

Thereafter, MEK and IPA were removed from the phase-changed substance with a rotary evaporator (manufactured by TOKYO RIKAKIKAI CO., LTD.) to obtain a polyurethane resin emulsion A.

After the thus-obtained polyurethane resin emulsion A was cooled down to room temperature, deionized water and aqueous solution of sodium hydroxide were added to adjust the solution to achieve a solid content concentration of 50 percent by mass and a pH of 8.

The glass transition temperature Tg of the polyurethane resin emulsion A was −5 degrees C. as measured by Thermo plus EVO2 (manufactured by Rigaku Corporation).

Preparation of Urethane Resin Emulsion B
(1) 1 mol of 1,6-hexane diol, (2) 1.4 mol of dicyclohexyl methane diisocyanate, (3) 1 mol of a trimer of isocyanulate of 1,6-hexamethylene diisocyanate, (4) 0.1 mol of diisocyanate compound obtained by reacting ⅓ mol of polyethylene glycol monomethyl ether having a molecular weight of 1,000 to 1 mol of 1,6-hexane diol, and (5) N-methyl-2-pyrrolidone at 15 percent by mass of the total mass were placed in a reaction flask to allow reaction at 90 degrees C. for two hours in a nitrogen atmosphere. A prepolymer composition was thus obtained.

A total of 450 g of the thus-obtained prepolymer composition with a solid content of 85 percent by mass was added dropwise in 15 minutes to 600 g of water in which 0.2 g of silicone-based defoaming agent (SE-21, manufactured by Wacker Asahikasei Silicone Co., Ltd.) was dissolved. Subsequent to stirring at 25 degrees C. for 10 minutes, the compound represented by the Chemical Formula A, ethylenediamine, and adipic acid dihydrazide were added dropwise to obtain a polyurethane resin emulsion B.

Chemical Formula A

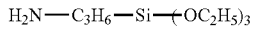

The glass transition temperature Tg of the polyurethane resin emulsion B was measured with a differential scanning calorimeter (DSC) (Thermo plus EVO2/DSC, manufactured by Rigaku Corporation). It was 20 degrees C.

Preparation of White Pigment Dispersion (Pigment Dispersion of Titanium Dioxide)

A total of 37.5 parts of acrylic copolymer, DISPER BYK-2008, solid content concentration of 60 percent by mass, manufactured by BYK, was dissolved in 20.0 parts of highly pure water in a beaker. A total of 30.0 parts of titanium oxide, JR-600A, primary particle diameter of 250 nm, surface treated with aluminum, manufactured by TAYCA CORPORATION, was added to the beaker followed by stirring at 5,000 rpm for 30 minutes with an Excel Auto Homogenizer, manufactured by NISSEI Corporation, until no chunk was present. The resulting liquid was stirred for 30 minutes at 10,000 rpm while the rate of rotation is slowly increased to 10,000 rpm.

While being cooled down with water, the liquid dispersion of titanium dioxide pigment was treated with ultrasonic homogenizer (US-300T, tip diameter of 26, manufactured by NISSEI Corporation) at 200 μA for one hour followed by filtering with a 5 μm membrane filter of cellulose acetate film to obtain a white pigment dispersion with a solid content concentration of titanium dioxide pigment of 34.3 percent by mass.

Preparation Examples of White Inks 1 to 16
The materials of the preparations shown in Tables 2 to 6 except for the white pigment dispersion and urethane resin emulsion were dissolved in deionized water to achieve the entire of ink to be 100 in the end to prepare a vehicle. Next, the urethane resin emulsion and then the white pigment dispersion element were admixed, followed by filtering with a filter having an average pore of 0.8 μm to obtain white inks 1 to 16.

The details, such as product names and manufacturers, of each material shown in Tables 2 to 6 are as follows.

Organic Solvent
  Glycerin (SP value: 16.4, manufactured by Tokyo Chemical Industry Co. Ltd.)

3-methyl-1,3-butane diol, (SP value of 12.1, manufactured by Tokyo Chemical Industry Co. Ltd.)
3-ethyl-3-hydroxyl methyl oxetane (SP value: 11.3, manufactured by Tokyo Chemical Industry Co. Ltd.)
2-ethyl-1,3-hexane diol, (SP value of 10.6, manufactured by Tokyo Chemical Industry Co. Ltd.)
β-methoxy-N,N-dimethylpropione amide (SP value of 9.2, manufactured by Idemitsu Kosan Co., Ltd.)
Triethylene glycol butyhlmethyl ether (SP value of 8.4, manufactured by Tokyo Chemical Industry Co. Ltd.)

Resin
  Acrylic resin emulsion (VONCOAT CF-6140, Tg of 12 degrees C., manufactured by DIC Corporation)

Surfactant
  BYK348, silicone-based surfactant, manufactured by BYK-Chemie GmbH
  FS300 (fluorochemical surfactant, manufactured by E.I. du Pont de Nemours and Company) Additive (Preservatives and Fungicides)
  Proxel LV (manufactured by Arch Chemical, Inc.)

TABLE 2

| | | Ink 1 | Ink 2 | Ink 3 | Ink 4 |
|---|---|---|---|---|---|
| Organic solvent | Glycerin (SP value of 16.4) | 20 | 20 | 20 | 20 |
| | 3-methyl-1,3-butane diol, SP value of 12.1 | 0 | 0 | 0 | 0 |
| | 3-ethyl-3-hydroxyl methyl oxetane, SP value of 11.3 | 0 | 0 | 0 | 0 |
| | 2-ethyl-1,3-hexanediol, SP value of 10.6 | 0 | 0 | 0 | 1.5 |
| | Triethylene glycol mono-butyl ether, SP value of 9.8 | 0 | 0 | 0 | 0 |
| | β-methoxy-N,N-dimethyl propionamide, SP value of 9.2 | 1.5 | 0.5 | 2.5 | 0 |
| | Triethylene glycol butyhlmethyl ether, SP value of 8.4 | 0 | 0 | 0 | 0 |
| Resin | Polyurethane resin emulsion A (Tg of −5 degrees C.) | 10 | 10 | 10 | 10 |
| | Polyurethane resin emulsion B (Tg of 20 degrees C.) | 0 | 0 | 0 | 0 |
| | Acrylic resin emulsion (Tg of 12 degrees C.) | 0 | 0 | 0 | 0 |
| White pigment | Pigment dispersion 1 (solid content concentration) | 10 | 10 | 10 | 10 |
| Surfactant | BYK-348 | 0.5 | 0.5 | 0.5 | 0.5 |
| | FS-300 | 0 | 0 | 0 | 0 |
| Additive | PROXEL LV | 0.01 | 0.01 | 0.01 | 0.01 |
| | Pure water | Balance | Balance | Balance | Balance |
| | Total | 100 | 100 | 100 | 100 |

TABLE 3

| | | Ink 5 | Ink 6 | Ink 7 | Ink 8 |
|---|---|---|---|---|---|
| Organic solvent | Glycerin (SP value of 16.4) | 20 | 20 | 20 | 20 |
| | 3-methyl-1,3-butane diol, SP value of 12.1 | 0 | 0 | 0 | 0 |
| | 3-ethyl-3-hydroxyl methyl oxetane, SP value of 11.3 | 0 | 1.5 | 0 | 0 |
| | 2-ethyl-1,3-hexanediol, SP value of 10.6 | 1 | 0 | 0 | 0 |
| | Triethylene glycol mono-butyl ether, SP value of 9.8 | 0 | 0 | 0 | 0 |
| | β-methoxy-N,N-dimethyl propionamide, SP value of 9.2 | 1 | 0 | 1.5 | 1.5 |
| | Triethylene glycol butyhlmethyl ether, SP value of 8.4 | 0 | 0 | 0 | 0 |
| Resin | Polyurethane resin emulsion A (Tg of −5 degrees C.) | 10 | 10 | 10 | 10 |
| | Polyurethane resin emulsion B (Tg of 20 degrees C.) | 0 | 0 | 0 | 0 |
| | Acrylic resin emulsion (Tg of 12 degrees C.) | 0 | 0 | 0 | 0 |
| White pigment | Pigment dispersion 1 (solid content concentration) | 10 | 10 | 10 | 6 |
| Surfactant | BYK-348 | 0.5 | 0.5 | 0 | 0.5 |
| | FS-300 | 0 | 0 | 0.5 | 0 |
| Additive | PROXEL LV | 0.01 | 0.01 | 0.01 | 0.01 |
| | Pure water | Balance | Balance | Balance | Balance |
| | Total | 100 | 100 | 100 | 100 |

TABLE 4

| | | Ink 9 | Ink 10 | Ink 11 | Ink 12 |
|---|---|---|---|---|---|
| Organic solvent | Glycerin (SP value of 16.4) | 20 | 20 | 20 | 6 |
| | 3-methyl-1,3-butane diol, SP value of 12.1 | 0 | 0 | 0 | 0 |
| | 3-ethyl-3-hydroxyl methyl oxetane, SP value of 11.3 | 0 | 0 | 0 | 0 |
| | 2-ethyl-1,3-hexanediol, SP value of 10.6 | 0 | 0 | 0 | 0 |
| | Triethylene glycol mono-butyl ether, SP value of 9.8 | 0 | 0 | 0 | 1.5 |
| | β-methoxy-N,N-dimethyl propionamide, SP value of 9.2 | 1.5 | 1.5 | 1.5 | 0 |
| | Triethylene glycol butyhlmethyl ether, SP value of 8.4 | 0 | 0 | 0 | 0 |
| Resin | Polyurethane resin emulsion A (Tg of −5 degrees C.) | 10 | 10 | 10 | 10 |
| | Polyurethane resin emulsion B (Tg of 20 degrees C.) | 0 | 0 | 0 | 0 |
| | Acrylic resin emulsion (Tg of 12 degrees C.) | 0 | 0 | 0 | 0 |

TABLE 4-continued

|  |  | Ink | | | |
|---|---|---|---|---|---|
|  |  | 9 | 10 | 11 | 12 |
| White pigment | Pigment dispersion 1 (solid content concentration) | 8 | 11 | 15 | 8 |
| Surfactant | BYK-348 | 0.5 | 0.5 | 0.5 | 0.5 |
|  | FS-300 | 0 | 0 | 0 | 0 |
| Additive | PROXEL LV | 0.01 | 0.01 | 0.01 | 0.01 |
|  | Pure water | Balance | Balance | Balance | Balance |
|  | Total | 100 | 100 | 100 | 100 |

TABLE 5

|  |  | Ink | | | | |
|---|---|---|---|---|---|---|
|  |  | 13 | 14 | 15 | 16 | 17 |
| Organic solvent | Glycerin (SP value of 16.4) | 20 | 20 | 20 | 20 | 20 |
|  | 3-methyl-1,3-butane diol, SP value of 12.1 | 1.5 | 0 | 0 | 0 | 0 |
|  | 3-ethyl-3-hydroxyl methyl oxetane, SP value of 11.3 | 0 | 0 | 0 | 0 | 0 |
|  | 2-ethyl-1,3-hexanediol, SP value of 10.6 | 0 | 0 | 0 | 0 | 0 |
|  | Triethylene glycol mono-butyl ether, SP value of 9.8 | 0 | 0 | 0 | 0 | 0 |
|  | β-methoxy-N,N-dimethyl propionamide, SP value of 9.2 | 0 | 0 | 5 | 1.5 | 1.5 |
|  | Triethylene glycol butyhlmethyl ether, SP value of 8.4 | 0 | 1.5 | 0 | 0 | 0 |
| Resin | Polyurethane resin emulsion A (Tg of −5 degrees C.) | 10 | 10 | 10 | 10 | 10 |
|  | Polyurethane resin emulsion B (Tg of 20 degrees C.) | 0 | 0 | 0 | 0 | 0 |
|  | Acrylic resin emulsion (Tg of 12 degrees C.) | 0 | 0 | 0 | 0 | 0 |
| White pigment | Pigment dispersion 1 (solid content concentration) | 10 | 10 | 10 | 5 | 18 |
| Surfactant | BYK-348 | 0.5 | 0.5 | 0.5 | 0.5 | 0.5 |
|  | FS-300 | 0 | 0 | 0 | 0 | 0 |
| Additive | PROXEL LV | 0.01 | 0.01 | 0.01 | 0.01 | 0.01 |
|  | Pure water | Balance | Balance | Balance | Balance | Balance |
|  | Total | 100 | 100 | 100 | 100 | 100 |

TABLE 6

|  |  | Ink | | | |
|---|---|---|---|---|---|
|  |  | 18 | 19 | 20 | 21 |
| Organic solvent | Glycerin (SP value of 16.4) | 20 | 20 | 20 | 20 |
|  | 3-methyl-1,3-butane diol, SP value of 12.1 | 0 | 0 | 0 | 0 |
|  | 3-ethyl-3-hydroxyl methyl oxetane, SP value of 11.3 | 0 | 0 | 0 | 0 |
|  | 2-ethyl-1,3-hexanediol, SP value of 10.6 | 0 | 0 | 0 | 0 |
|  | Triethylene glycol mono-butyl ether, SP value of 9.8 | 0 | 0 | 0 | 0 |
|  | β-methoxy-N,N-dimethyl propionamide, SP value of 9.2 | 1.5 | 1.5 | 0.3 | 3 |
|  | Triethylene glycol butyhlmethyl ether, SP value of 8.4 | 0 | 0 | 0 | 0 |

TABLE 6-continued

|  |  | Ink | | | |
|---|---|---|---|---|---|
|  |  | 18 | 19 | 20 | 21 |
| Resin | Polyurethane resin emulsion A (Tg of −5 degrees C.) | 0 | 0 | 10 | 10 |
|  | Polyurethane resin emulsion B (Tg of 20 degrees C.) | 10 | 0 | 0 | 0 |
|  | Acrylic resin emulsion (Tg of 12 degrees C.) | 0 | 10 | 0 | 0 |
| White pigment | Pigment dispersion 1 (solid content concentration) | 10 | 10 | 10 | 10 |
| Surfactant | BYK-348 | 0.5 | 0.5 | 0.5 | 0.5 |
|  | FS-300 | 0 | 0 | 0 | 0 |
| Additive | PROXEL LV | 0.01 | 0.01 | 0.01 | 0.01 |
|  | Pure water | Balance | Balance | Balance | Balance |
|  | Total | 100 | 100 | 100 | 100 |

Resistance to wiping, the degree of whiteness, color fastness to washing and laundering, discharging stability, and texture were evaluated in the following manner using the processing fluid and white ink obtained. The results are shown in Tables 7 to 8.

Resistance to Wiping

An inkjet printer (IPSiO Gxe 5500, manufactured by Ricoh Co., Ltd. Ricoh Co., Ltd.) was filled with the inks 1 to 21, followed by a sequence of cleaning. As the nozzle plate, a nozzle plate with a silicone layer with an average thickness of from 0.5 to 1.0 μm was made and used.

Thereafter, a nozzle check pattern was printed. The number of cleaning sequences was measured when the number of non-discharging nozzles was 10 or more. The resistance to wiping was evaluated according to the following evaluation criteria. A and B are preferable for practical purposes.

Cleaning refers to an operation of wiping an inkjet nozzle and the vicinity therearound with a wiper after a minor amount of ink is discharged from the inkjet nozzle.

Evaluation Criteria
 A: the number of cleaning sequences is 3,000 or more
 B: the number of cleaning sequences is 2,000 to less than 3,000
 C: the number of cleaning sequences is less than 2,000

Whiteness

A high performance garment inkjet printer (RICOH Ri 2000, manufactured by Ricoh Co., Ltd.) was filled with the prepared processing fluids 1 to 3 and adjusted to achieve an amount of the processing fluid attached to be 20 mg/cm$^2$. Thereafter, a solid image with a length of 27 cm and a width of 23 cm was printed on a thin dark color fabric (Heavy weight T-shirt, black, manufactured by TOMS CO., LTD.) at a resolution of 600 dpi×1,200 dpi. Thereafter, the image was dried at 165 degrees C. for 60 seconds.

Then the high performance garment inkjet printer (RICOH Ri 2000, manufactured by Ricoh Co., Ltd.) was filled with the prepared inks 1 to 21 and adjusted to achieve an amount of the ink attached to be 20 mg/cm$^2$. Thereafter, a solid image with a length of 10 cm and a width of 10 cm was printed on a region where the processing fluid was printed at a resolution of 600 dpi×1,200 dpi. Thereafter, the image was dried at 165 degrees C. for 90 seconds to obtain sample images 1 to 16.

The luminosity (L*) of the solid image portion of the sample images obtained was measured with a spectrophotometer, X-rite eXact, manufactured by X-Rite Inc., and evaluated regarding the degree of whiteness according to the following evaluation criteria. A and B are preferable for practical purposes.

Evaluation Criteria
 A: L* value is 75 or greater
 B: L* value is 65 to less than 75
 C: L* value is less than 65.

Color Fastness to Washing and Laundering

Each sample image was washed 10 times using a automatic washing machine (ASW-45A1, manufactured by Sanyo Electric Co., Ltd.). According to JIS L0844 format, discoloration of the images was visually checked using a discoloration gray scale and color fastness to washing and laundering was evaluated based on the following evaluation criteria.

Evaluation Criteria
 A: 4 or higher
 B: 3 to less than 4
 C: Less than 3

Texture

The sample image was touched with hands and its texture was evaluated according to the following evaluation criteria.

Evaluation Criteria
 A: Feels smooth and soft
 B: Feels slightly rough
 C: Feels hard Discharging Stability A high performance garment inkjet printer (RICOH Ri 2000, manufactured by Ricoh Co., Ltd.) was filled with the inks 1 to 21 and a white solid image of 297 mm long and 420 mm wide was printed at 600 dpi×1,200 dpi. After the nozzle check pattern was printed, the number of non-discharging nozzles was counted. Discharging stability was evaluated according to the following evaluation criteria. A and B are preferable for practical purposes.

Evaluation Criteria
 A: Number of non-discharging nozzles was from 0 to less than 3
 B: Number of non-discharging nozzles was from 3 to less than 10
 C: The number of non-discharging nozzles was from 10 or greater

TABLE 7

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| | Ink | 1 | 1 | 2 | 3 | 4 | 5 | 6 | 7 | 8 | 9 | 10 | 11 | 12 |
| | Processing fluid | 1 | 2 | 1 | 1 | 1 | 1 | 1 | 1 | 1 | 1 | 1 | 1 | 1 |
| Evaluation result | Resistance to wiping | A | A | A | A | A | A | B | A | A | A | A | B | A |
| | Degree of whiteness | A | A | A | B | A | A | A | A | B | A | A | A | B |

TABLE 7-continued

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Color fastness to washing and laundering | A | A | A | A | A | A | A | A | A | A | B | A | A |
| Discharging stability | A | A | A | A | A | A | A | A | A | A | A | B | A |
| Texture | A | A | A | A | A | A | A | A | A | A | B | A | A |

TABLE 8

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| Ink | | 1 | 13 | 14 | 15 | 16 | 17 | 18 | 19 | 20 | 21 |
| Processing fluid | | 3 | 1 | 1 | 1 | 1 | 1 | 1 | 1 | 1 | 1 |
| Evaluation result | Resistance to wiping | A | C | C | B | A | C | A | A | C | B |
| | Degree of whiteness | C | A | A | C | C | A | A | A | A | C |
| | Color fastness to washing and laundering | B | A | A | B | B | A | A | C | A | B |
| | Discharging stability | A | A | A | A | A | C | A | A | A | A |
| | Texture | A | A | A | A | A | A | C | C | A | A |

Aspects of the present disclosure include, but are not limited to the following:

1. An ink discharging device includes an ink containing an organic solvent with an SP value of from 9.0 to 12.0, a white pigment, a polyurethane resin with a glass transition temperature Tg of 0 degrees C. or lower, and water, and an ink discharging unit including a nozzle plate including a liquid repellent layer containing a silicone resin, the ink discharging unit for discharging the ink, wherein the proportion of the organic solvent to the entire of the ink is from 0.5 to 2.5 percent by mass, wherein the proportion of the white pigment to the entire of the ink is from 6 to 15 percent by mass.
2. The ink discharging device according to 1 mentioned above, wherein the SP value of the organic solvent is from 9.0 to 10.6.
3. The ink discharging device according to 1 or 2 mentioned above, wherein the proportion of the white pigment to the entire of the ink is from 8 to 11 percent by mass.
4. The ink discharging device according to any one of 1 to 3 mentioned above further contains a processing fluid containing a multivalent metal salt and water.
5. The ink discharging device according to 4 mentioned above, wherein the multivalent metal salt contains at least one of calcium chloride or calcium nitrate.
6. The ink discharging device according to any one of 1 to 5 mentioned above further contains an ink container accommodating the ink.
7. The ink discharging device according to any one of 1 to 6 mentioned above includes a processing fluid container accommodating the processing fluid.
8. A method of discharging an ink includes discharging the ink to a substrate with the ink discharging device of any one of 1 to 7 mentioned above.
9. The method according to 8 mentioned above, wherein the substrate is fabric.
10. A method of manufacturing ink-discharged matter includes applying a processing fluid containing a multivalent metal salt and water and discharging an ink containing an organic solvent with an SP value of from 9.0 to 12.0, a white pigment, a polyurethane resin with a glass transition temperature Tg of 0 degrees C. or lower, and water, with an ink discharging unit including a nozzle plate including a liquid repellent layer containing a silicone resin, wherein the proportion of the organic solvent to the entire of the ink is from 0.5 to 2.5 percent by mass, wherein the proportion of the white pigment to the entire of the ink is from 6 to 15 percent by mass.
11. A method of manufacturing ink-discharged matter includes applying a processing fluid containing a multivalent metal salt and water and discharging an ink containing an organic solvent with an SP value of from 9.0 to 12.0, a white pigment, a polyurethane resin with a glass transition temperature Tg of 0 degrees C. or lower, and water, with an ink discharging unit including a nozzle plate including a liquid repellent layer containing a silicone resin, wherein the proportion of the organic solvent to the entire of the ink is from 0.5 to 2.5 percent by mass, wherein the proportion of the white pigment to the entire of the ink is from 6 to 15 percent by mass.
12. A white ink contains an organic solvent with an SP value of from 9.0 to 12.0, a white pigment, a polyurethane resin with a glass transition temperature Tg of 0 degrees C. or lower, and water, wherein the proportion of the organic solvent to the entire of the white ink is from 0.5 to 2.5 percent by mass, wherein the proportion of the white pigment to the entire of the white ink is from 6 to 15 percent by mass.
13. A set contains a processing fluid containing a multivalent metal salt and water and an ink containing an organic solvent with an SP value of from 9.0 to 12.0; a white pigment, a polyurethane resin with a glass transition temperature Tg of 0 degrees C. or lower, and water, wherein the proportion of the organic solvent to the entire of the ink is from 0.5 to 2.5 percent by mass, wherein the proportion of the white pigment to the entire of the ink is from 6 to 15 percent by mass.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An ink discharging device comprising:
   an ink comprising: an organic solvent with an SP value of from 9.0 to 12.0; a white pigment; a polyurethane resin with a glass transition temperature Tg of 0 degrees C. or lower; and water; and
   an ink discharging unit comprising a nozzle plate comprising a liquid repellent layer containing a silicone resin, the ink discharging unit configured to discharge the ink,
   wherein a proportion of the organic solvent to an entire of the ink is from 0.5 to 2.5 percent by mass,
   wherein a proportion of the white pigment to an entire of the ink is from 6 to 15 percent by mass.

2. The ink discharging device according to claim 1, wherein the SP value of the organic solvent is from 9.0 to 10.6.

3. The ink discharging device according to claim 1, wherein a proportion of the white pigment to the entire of the ink is from 8 to 11 percent by mass.

4. The ink discharging device according to claim 1, further comprising a processing fluid comprising a multivalent metal salt and water.

5. The ink discharging device according to claim 4, wherein the multivalent metal salt comprises at least one of calcium chloride or calcium nitrate.

6. The ink discharging device according to claim 1, further comprising an ink container accommodating the ink.

7. The ink discharging device according to claim 4, further comprising a processing fluid container accommodating the processing fluid.

8. A method of discharging an ink comprising:
   discharging the ink to a substrate with the ink discharging device of claim 1.

9. The method according to claim 8, wherein the substrate comprises fabric.

10. A method of manufacturing ink-discharged matter comprising:
    applying a processing fluid comprising a multivalent metal salt and water; and
    discharging an ink comprising an organic solvent with an SP value of from 9.0 to 12.0, a white pigment, a polyurethane resin with a glass transition temperature Tg of 0 degrees C. or lower, and water, with an ink discharging unit comprising a nozzle plate comprising a liquid repellent layer containing a silicone resin,
    wherein a proportion of the organic solvent to an entire of the ink is from 0.5 to 2.5 percent by mass,
    wherein a proportion of the white pigment to an entire of the ink is from 6 to 15 percent by mass.

11. A white ink comprising:
    an organic solvent with an SP value of from 9.0 to 12.0;
    a white pigment;
    a polyurethane resin with a glass transition temperature Tg of 0 degrees C. or lower; and
    water,
    wherein a proportion of the organic solvent to an entire of the white ink is from 0.5 to 2.5 percent by mass,
    wherein a proportion of the white pigment to an entire of the white ink is from 6 to 15 percent by mass.

12. A set comprising:
    a processing fluid comprising a multivalent metal salt and water; and
    the white ink of claim 11.

* * * * *